US012724394B2

(12) United States Patent
Yamamoto et al.

(10) Patent No.: US 12,724,394 B2
(45) Date of Patent: Sep. 1, 2026

(54) PROGRAM CREATION ASSISTANCE SYSTEM AND COMPUTER READABLE MEDIUM

(71) Applicant: Mitsubishi Electric Corporation, Tokyo (JP)

(72) Inventors: Kenzo Yamamoto, Tokyo (JP); Satoshi Noguchi, Tokyo (JP)

(73) Assignee: MITSUBISHI ELECTRIC CORPORATION, Tokyo (JP)

( * ) Notice: Subject to any disclaimer, the term of this patent is extended or adjusted under 35 U.S.C. 154(b) by 503 days.

(21) Appl. No.: 18/230,372

(22) Filed: Aug. 4, 2023

(65) Prior Publication Data

US 2023/0375999 A1 Nov. 23, 2023

Related U.S. Application Data

(63) Continuation of application No. PCT/JP2021/012914, filed on Mar. 26, 2021.

(51) Int. Cl.
*G05B 19/05* (2006.01)

(52) U.S. Cl.
CPC .. *G05B 19/056* (2013.01); *G05B 2219/13067* (2013.01)

(58) Field of Classification Search
CPC .................... G05B 19/056; G05B 2219/13067
USPC .......................................................... 700/118
See application file for complete search history.

(56) References Cited

U.S. PATENT DOCUMENTS

2005/0033457 A1* 2/2005 Yamane ............... G05B 19/056 700/18
2016/0034259 A1* 2/2016 Yamaoka ................. G06F 8/30 717/107
2016/0132305 A1* 5/2016 Morota .................. G06F 8/427 717/144
2019/0155243 A1* 5/2019 Ino ....................... G05B 19/058
2022/0155746 A1* 5/2022 Ikeda .................. G06F 13/1657
2022/0171360 A1* 6/2022 Iwamura ............. G05B 19/056

FOREIGN PATENT DOCUMENTS

JP 9-198110 A 7/1997
JP 9-274513 A 10/1997
JP 2007-272679 A 10/2007
(Continued)

OTHER PUBLICATIONS

International Search Report (PCT/ISA/210) issued in PCT/JP2021/012914, dated May 25, 2021.

*Primary Examiner* — Md Azad
(74) *Attorney, Agent, or Firm* — Birch, Stewart, Kolasch & Birch, LLP

(57) ABSTRACT

A program fragmentation unit (131) divides a target program into fragments according to groups of processing. A fragment group extraction unit (132) extracts, from among sets of fragments, each set in which instruction groups match between fragments, as a fragment group. A functionalization candidate extraction unit (136) extracts, from among sets of fragment groups, a set in which instruction groups match between fragment groups, usage patterns of a variable group match between the fragment groups, and types of variables match between the fragment groups, as a functionalization candidate. An output unit (140) outputs information on the functionalization candidate.

11 Claims, 29 Drawing Sheets

(56) References Cited

FOREIGN PATENT DOCUMENTS

| | | | |
|---|---|---|---|
| JP | 2008-33913 | A | 2/2008 |
| JP | 2015-179369 | A | 10/2015 |
| JP | 2019-95896 | A | 6/2019 |
| JP | 6664563 | B1 | 3/2020 |
| JP | 2020-149168 | A | 9/2020 |
| WO | WO 2014/155717 | A1 | 10/2014 |
| WO | WO 2020/178983 | A1 | 9/2020 |

* cited by examiner

200: PROGRAM OPERATION SYSTEM
PROGRAM CREATION ASSISTANCE SYSTEM
100
202: NETWORK
CONTROL DEVICE
210
201: NETWORK
220
FACILITY
FACILITY
FACILITY
FACILITY
FACILITY
221
221
221
221
221
FACTORY LINE

Fig. 3

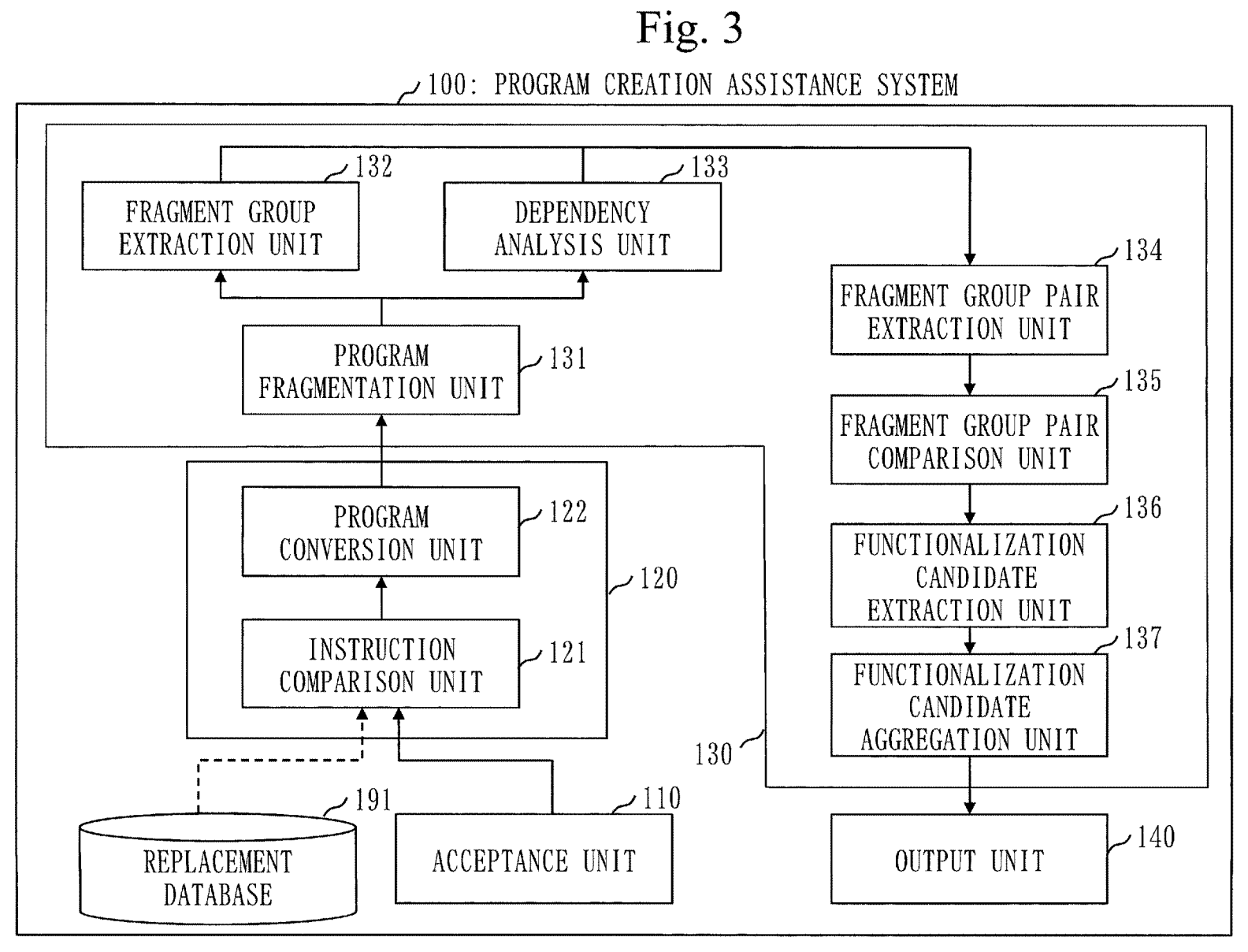

100: PROGRAM CREATION ASSISTANCE SYSTEM

130

131 PROGRAM FRAGMENTATION UNIT

132 FRAGMENT GROUP EXTRACTION UNIT

133 DEPENDENCY ANALYSIS UNIT

134 FRAGMENT GROUP PAIR EXTRACTION UNIT

135 FRAGMENT GROUP PAIR COMPARISON UNIT

136 FUNCTIONALIZATION CANDIDATE EXTRACTION UNIT

137 FUNCTIONALIZATION CANDIDATE AGGREGATION UNIT

140 OUTPUT UNIT

120

121 INSTRUCTION COMPARISON UNIT

122 PROGRAM CONVERSION UNIT

110 ACCEPTANCE UNIT

191 REPLACEMENT DATABASE

191:REPLACEMENT DATABASE

| No. | REPLACEMENT CONDITION | REPLACEMENT DETAILS |
|---|---|---|
| 1 | A BRANCH INSTRUCTION IS USED | WRITE THE BRANCH INSTRUCTION SEPARATELY |
| 2 | AN INSTRUCTION STARTING WITH "D" IS USED | REPLACE WITH AN INSTRUCTION WITHOUT D |
| : | : | : |

LADDER PROGRAM

Figure 14:
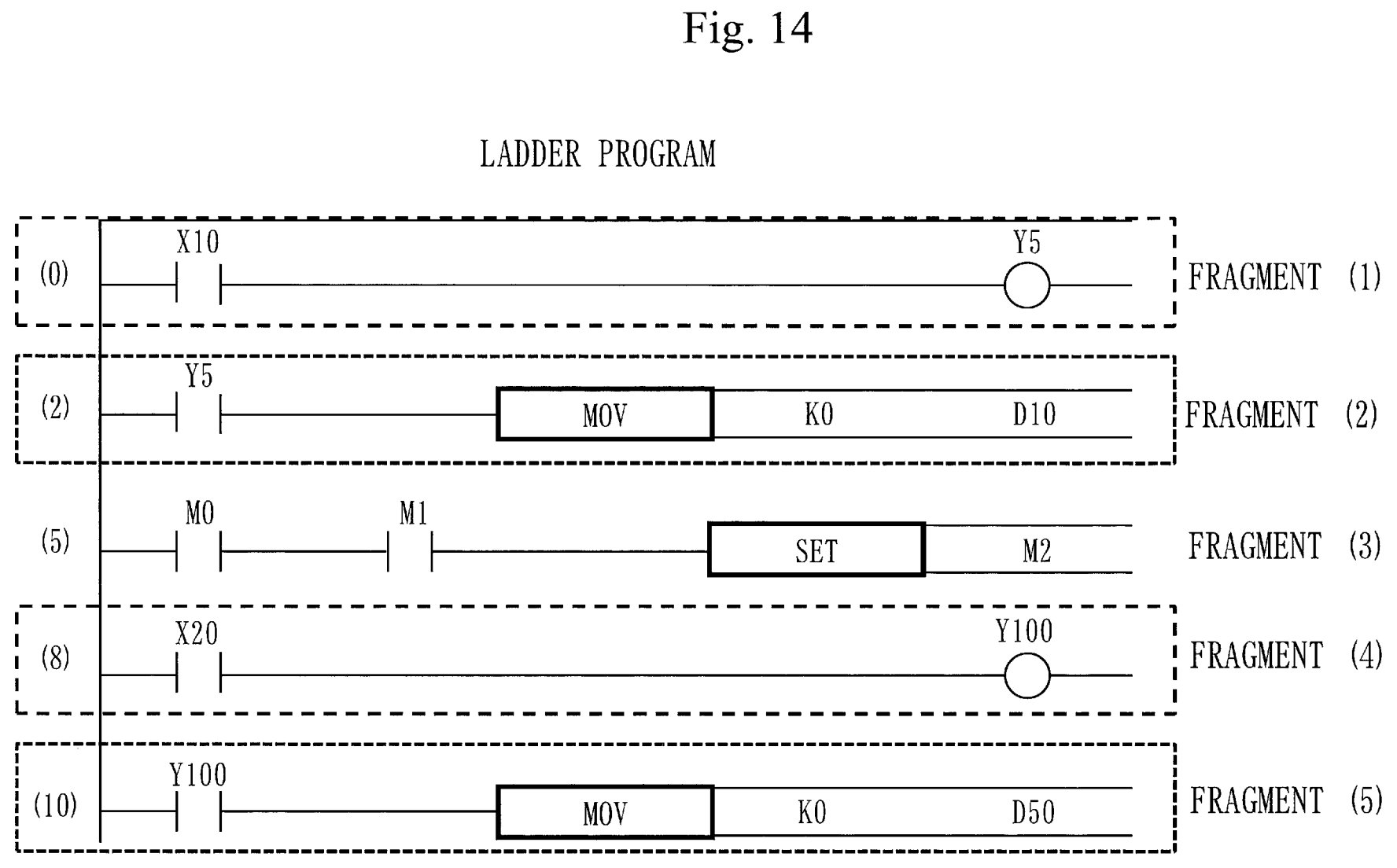

LADDER PROGRAM

FRAGMENT (1)
(0) X10 Y5

FRAGMENT (2)
(2) Y5 MOV K0 D10

FRAGMENT (3)
(5) M0 M1 SET M2

FRAGMENT (4)
(8) X20 Y100

FRAGMENT (5)
(10) Y100 MOV K0 D50

Fig. 15

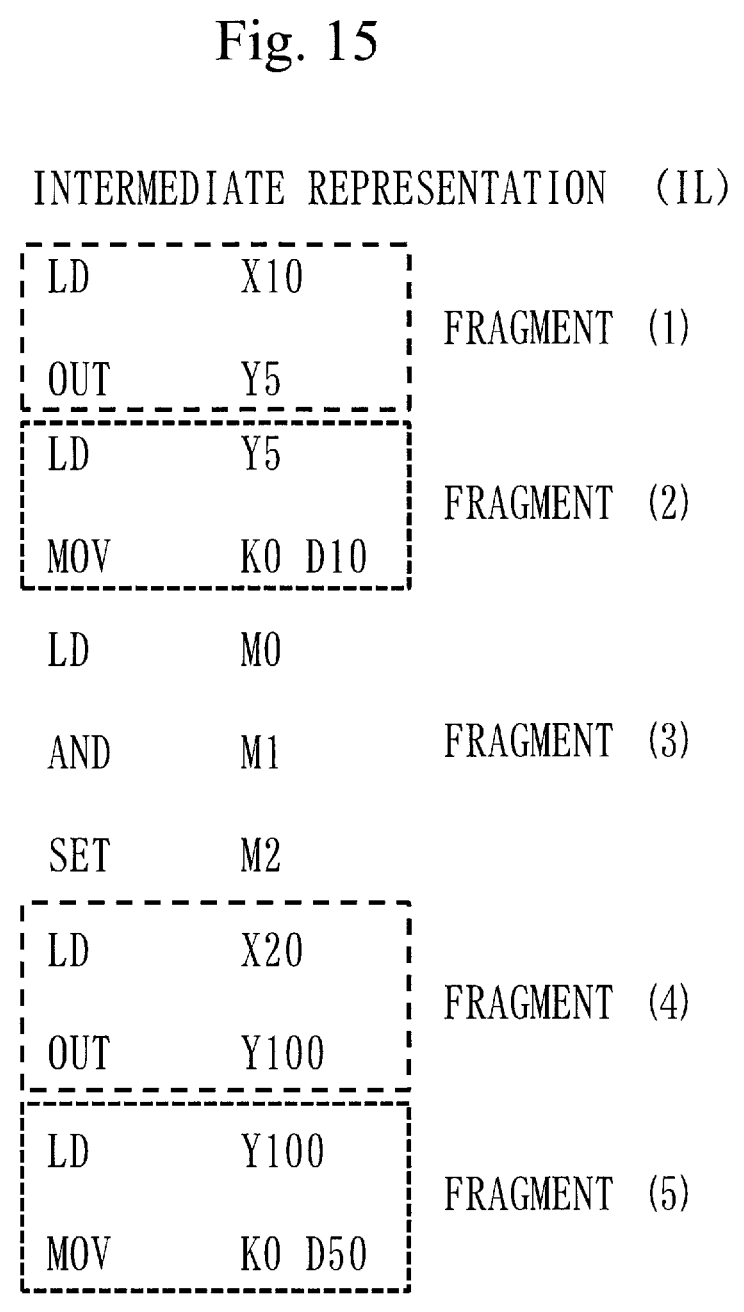

INTERMEDIATE REPRESENTATION (IL)

| Instruction | Operand | Fragment |
|---|---|---|
| LD | X10 | FRAGMENT (1) |
| OUT | Y5 | |
| LD | Y5 | FRAGMENT (2) |
| MOV | K0 D10 | |
| LD | M0 | FRAGMENT (3) |
| AND | M1 | |
| SET | M2 | |
| LD | X20 | FRAGMENT (4) |
| OUT | Y100 | |
| LD | Y100 | FRAGMENT (5) |
| MOV | K0 D50 | |

Fig. 17

INTERMEDIATE REPRESENTATION (IL)

| Instruction | Operand | Fragment |
| --- | --- | --- |
| LD | X1 | FRAGMENT (1) |
| OUT | M0 | |
| LD | X2 | FRAGMENT (2) |
| MOV | K0 D0 | |
| LD= | K10 D10 | FRAGMENT (3) |
| OUT | Y1 | |
| LD | X3 | FRAGMENT (4) |
| MOV | K10 D11 | |
| LD | X10 | FRAGMENT (5) |
| OUT | Y2 | |

LADDER PROGRAM

Fig. 19

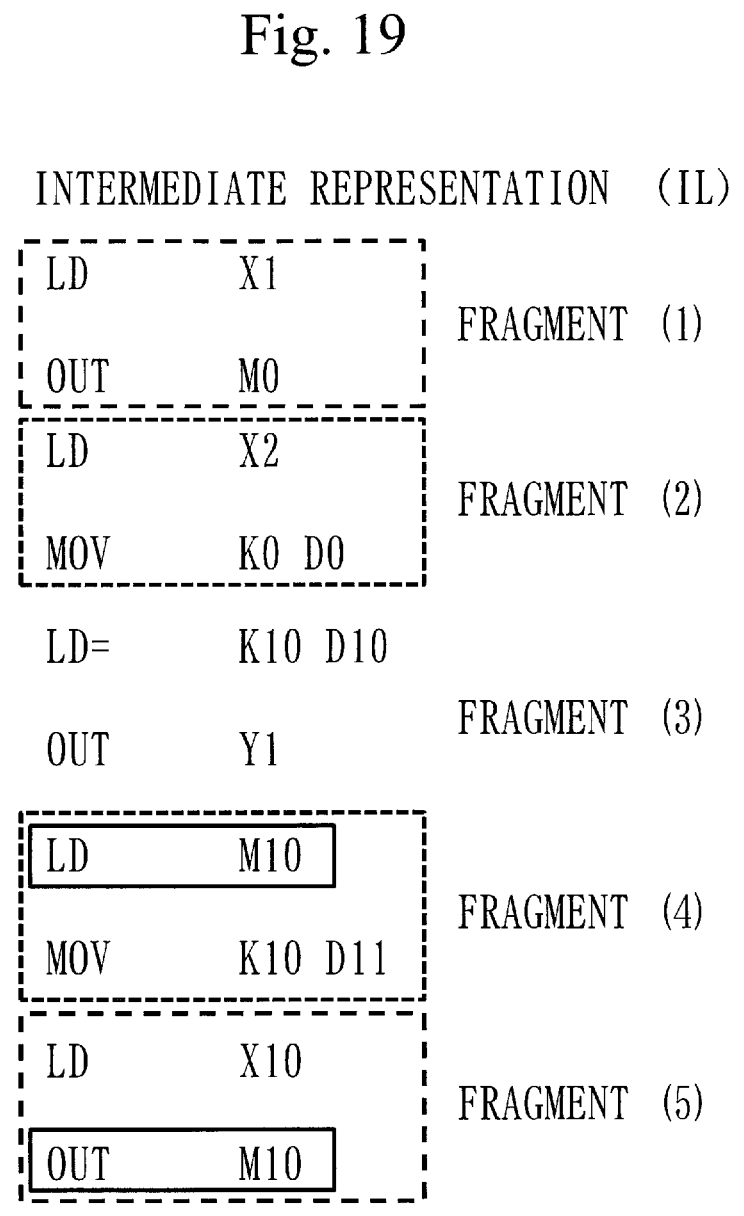

INTERMEDIATE REPRESENTATION (IL)

| Instruction | Operand | Fragment |
| --- | --- | --- |
| LD | X1 | FRAGMENT (1) |
| OUT | M0 | |
| LD | X2 | FRAGMENT (2) |
| MOV | K0 D0 | |
| LD= | K10 D10 | FRAGMENT (3) |
| OUT | Y1 | |
| LD | M10 | FRAGMENT (4) |
| MOV | K10 D11 | |
| LD | X10 | FRAGMENT (5) |
| OUT | M10 | |

Fig. 20

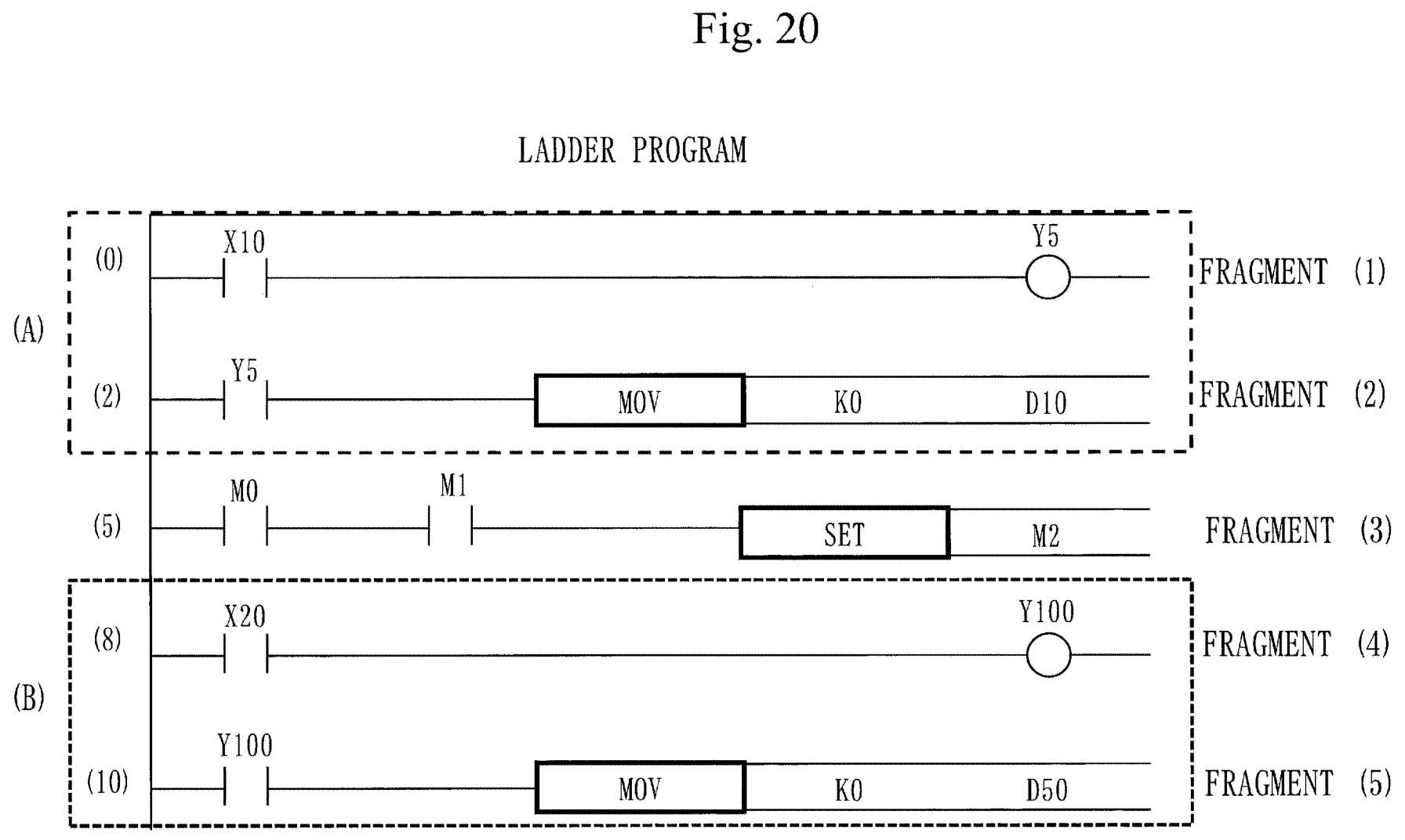

LADDER PROGRAM (A)

(0) X10 Y5 FRAGMENT (1)

(2) Y5 MOV K0 D10 FRAGMENT (2)

(5) M0 M1 SET M2 FRAGMENT (3)

(B)

(8) X20 Y100 FRAGMENT (4)

(10) Y100 MOV K0 D50 FRAGMENT (5)

Fig. 21

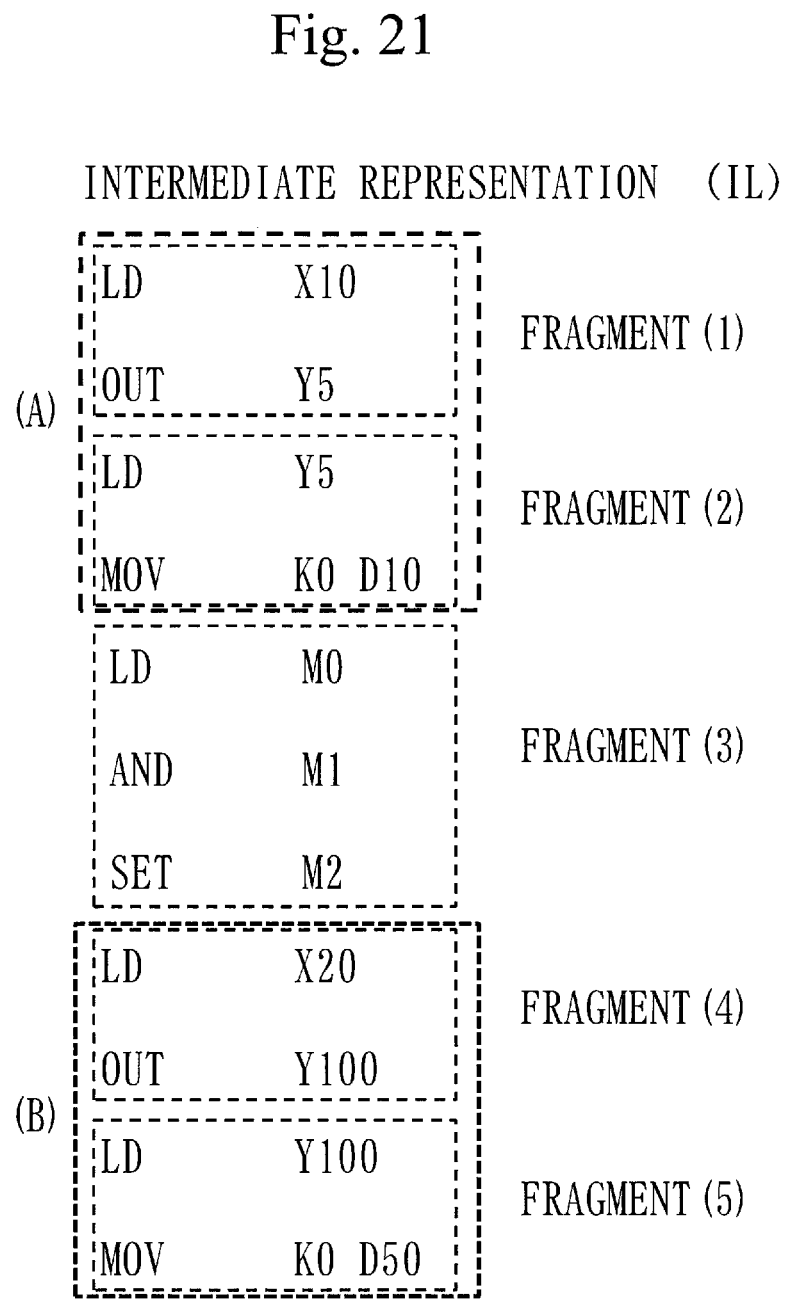

INTERMEDIATE REPRESENTATION (IL)

| | | | |
|---|---|---|---|
| (A) | LD X10<br>OUT Y5 | | FRAGMENT (1) |
| | LD Y5<br>MOV K0 D10 | | FRAGMENT (2) |
| | LD M0<br>AND M1<br>SET M2 | | FRAGMENT (3) |
| (B) | LD X20<br>OUT Y100 | | FRAGMENT (4) |
| | LD Y100<br>MOV K0 D50 | | FRAGMENT (5) |

Fig. 22

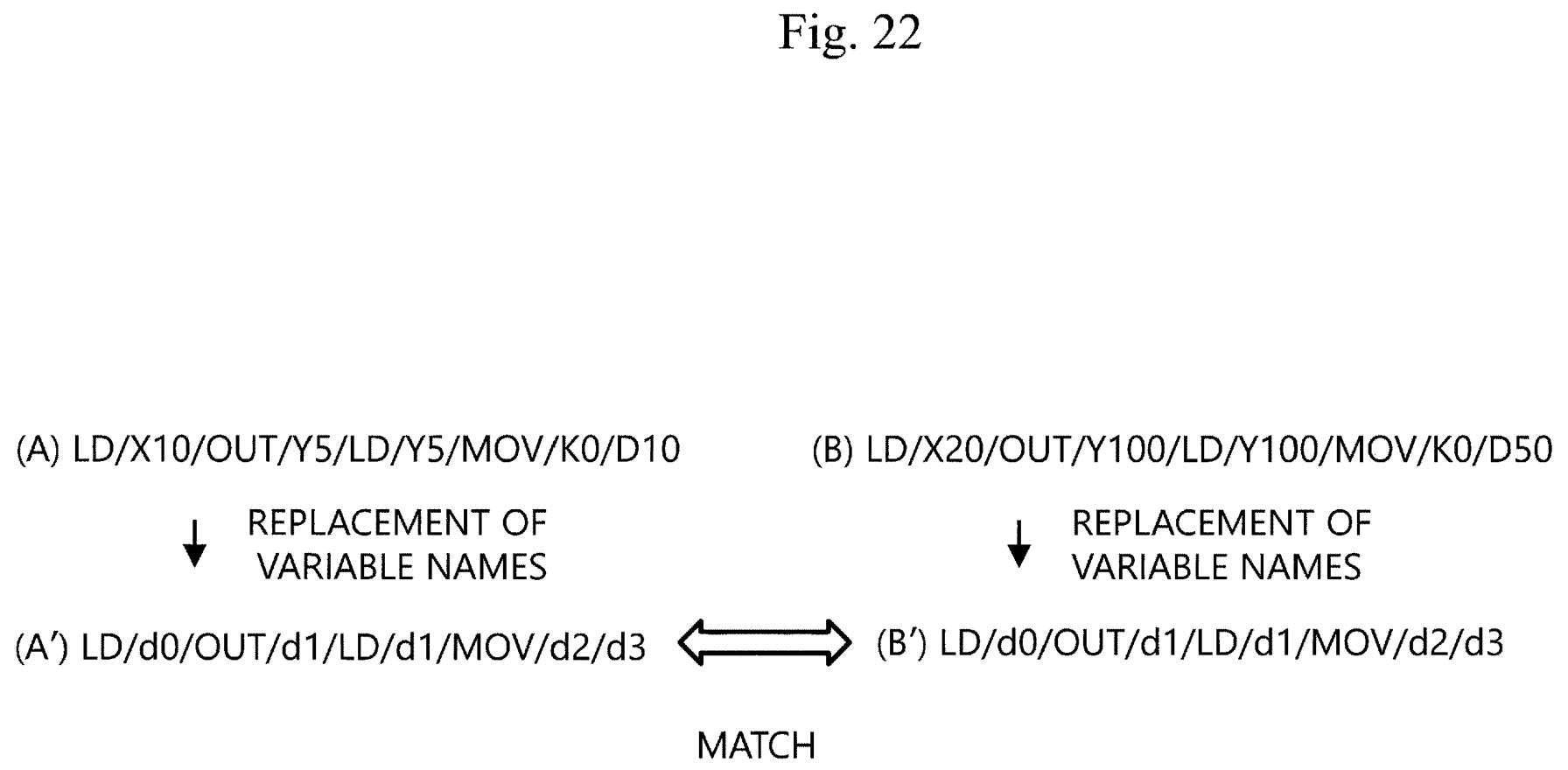

(A) LD/X10/OUT/Y5/LD/Y5/MOV/K0/D10

↓ REPLACEMENT OF VARIABLE NAMES (A') LD/d0/OUT/d1/LD/d1/MOV/d2/d3

(B) LD/X20/OUT/Y100/LD/Y100/MOV/K0/D50

↓ REPLACEMENT OF VARIABLE NAMES (B') LD/d0/OUT/d1/LD/d1/MOV/d2/d3

(A') ⇔ (B') MATCH

PROGRAM CREATION ASSISTANCE SYSTEM AND COMPUTER READABLE MEDIUM

CROSS REFERENCE TO RELATED APPLICATIONS

This application is a Continuation of PCT International Application No. PCT/JP2021/012914, filed on Mar. 26, 2021, which is hereby expressly incorporated by reference into the present application.

TECHNICAL FIELD

The present disclosure relates to a technology to assist creation of a program.

BACKGROUND ART

As a method for improving maintainability of a program, there is a method in which similar processes in the program are managed by being made common (functionalized).

However, there is a limit to manually extracting similar processes in a program. Therefore, there is a need for a technology to automatically extract similar processes in a program and present the similar processes to a user.

Patent Literature 1 discloses a technology to automatically extract common processes. In that technology, for at least one ladder circuit of two ladder circuits, the sequence of variables is rearranged so as not to change a result of a logical expression. Then, logical expressions are compared between the ladder circuits to determine whether the logical expressions match.

CITATION LIST

Patent Literature

Patent Literature 1: JP 2019-95896 A

SUMMARY OF INVENTION

Technical Problem

An object of the present disclosure is to make it possible to present a functionalization candidate in a target program.

Solution to Problem

A program creation assistance system of the present disclosure include

- a program fragmentation unit to divide a target program into fragments according to groups of processing;
- a fragment group extraction unit to extract, from among sets of fragments, each set in which instruction groups match between fragments, as a fragment group;
- a functionalization candidate extraction unit to extract, from among sets of fragment groups, a set in which instruction groups match between fragment groups, usage patterns of a variable group match between the fragment groups, and types of variables match between the fragment groups, as a functionalization candidate; and
- an output unit to output information on the functionalization candidate.

Advantageous Effects of Invention

According to the present disclosure, a functionalization candidate in a target program can be presented.

BRIEF DESCRIPTION OF DRAWINGS

FIG. 3 is a functional configuration diagram of the program creation assistance system 100 in Embodiment 1;

FIG. 5 is a flowchart of step S120 in Embodiment 1;

FIG. 6 is a figure illustrating an example of a replacement database 191 in Embodiment 1;

FIG. 13 is a figure illustrating an intermediate representation of the fragmented ladder program (FIG. 11) in Embodiment 1;

FIG. 14 is a figure illustrating an example of a fragmented ladder program in Embodiment 1;

FIG. 15 is a figure illustrating an intermediate representation of the fragmented ladder program (FIG. 14) in Embodiment 1;

FIG. 17 is a figure illustrating an intermediate representation of the fragmented ladder program (FIG. 16) in Embodiment 1;

FIG. 19 is a figure illustrating an intermediate representation of the fragmented ladder program (FIG. 18) in Embodiment 1;

FIG. 20 is a figure illustrating an example of a fragmented ladder program in Embodiment 1;

FIG. 21 is a figure illustrating an intermediate representation of the fragmented ladder program (FIG. 20) in Embodiment 1;

FIG. 22 is a figure illustrating comparison of strings between fragments in Embodiment 1;

DESCRIPTION OF EMBODIMENTS

In the embodiment and drawings, the same elements or corresponding elements are denoted by the same reference sign. Description of an element denoted by the same reference sign as that of an element that has been described will be suitably omitted or simplified. Arrows in figures mainly indicate flows of data or flows of processing.

Embodiment 1

A program creation assistance system 100 will be described based on FIGS. 1 to 29.

*Description of Configuration*

Figure 1:
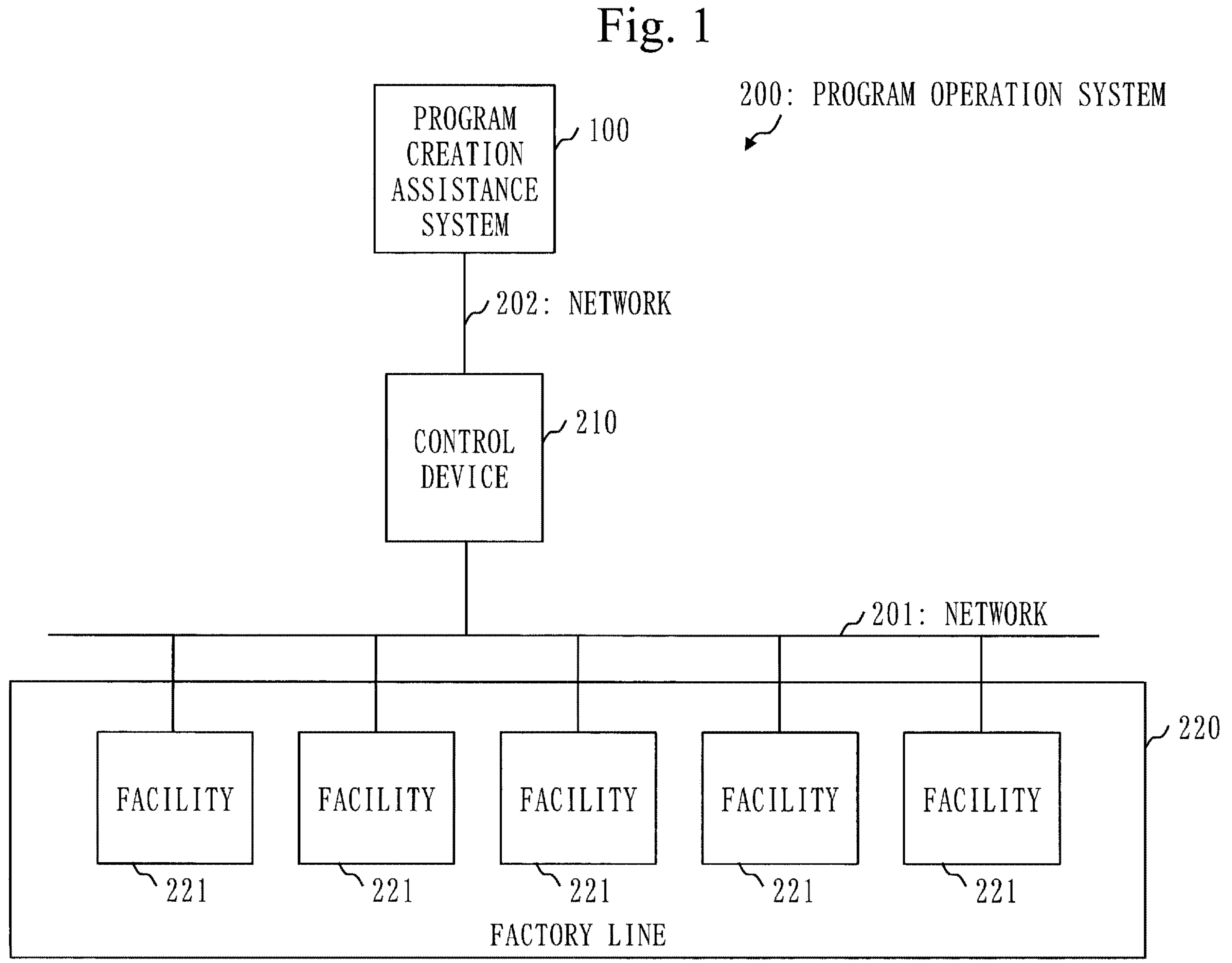
FIG. 1 is a configuration diagram of a program operation system 200 in Embodiment 1.

Based on FIG. 1, a program operation system 200 will be described.

The program operation system 200 is an example of a system in which a program is operated.

The program operation system 200 includes the program creation assistance system 100, a control device 210, and a factory line 220.

The program creation assistance system 100 is a system that assists creation of a program to be operated. A programmer uses the program creation assistance system 100 to edit the program.

The created program is transmitted to the control device 210 via a network 202.

The control device 210 controls the factory line 220 via a network 201 by executing the created program.

Specifically, the control device 210 is a device for a factory, such as a PLC. However, the control device 210 may be a general device, such as a personal computer.

PLC is an abbreviation for programmable logic controller.

The factory line 220 includes one or more facilities 221 to be controlled by the control device 210.

Each of the network 201 and the network 202 is, for example, a field network such as a CC-Link network, a general network such as an Ethernet network, or dedicated input and output lines.

The network 201 and the network 202 may be the same network, or may be mutually different networks.

Based on FIG. 2, a configuration of the program creation assistance system 100 will be described.

The program creation assistance system 100 is a computer that includes hardware such as a processor 101, a memory 102, a storage 103, a communication device 104, an input device 105, and a display device 106. These hardware components are connected with one another through signal lines.

The processor 101 is an IC that performs operational processing, and controls other hardware components. For example, the processor 101 is a CPU.

IC is an abbreviation for integrated circuit.

CPU is an abbreviation for central processing unit.

The memory 102 is a volatile or non-volatile storage device. For example, the memory 102 is a RAM. Data stored in the memory 102 is saved in the storage 103 as necessary.

RAM is an abbreviation for random access memory.

The storage 103 is a non-volatile storage device. For example, the storage 103 is a ROM, an HDD, an SSD, or a memory card reader/writer. Data stored in the storage 103 is loaded into the memory 102 as necessary.

ROM is an abbreviation for read only memory.

HDD is an abbreviation for hard disk drive.

SSD is an abbreviation for solid state drive.

The communication device 104 is a receiver and a transmitter. For example, the communication device 104 is a communication board for Ethernet or for a field network. Communication of the program creation assistance system 100 is performed using the communication device 104.

The input device 105 is a mouse, a keyboard, and the like.

The display device 106 is a display.

The program creation assistance system 100 may include a touch panel that functions as the input device 105 and the display device 106.

The program creation assistance system 100 includes elements such as an acceptance unit 110, an instruction unification unit 120, a candidate extraction unit 130, and an output unit 140. These elements are realized by software.

The storage 103 stores a program creation assistance program to cause a computer to function as the acceptance unit 110, the instruction unification unit 120, the candidate extraction unit 130, and the output unit 140. The program creation assistance program is loaded into the memory 102 and executed by the processor 101.

The storage 103 further stores an OS. At least part of the OS is loaded into the memory 102 and executed by the processor 101.

The processor 101 executes the program creation assistance program while executing the OS.

OS is an abbreviation for operating system.

Input data and output data of the program creation assistance program are stored in a storage unit 190.

The storage 103 functions as the storage unit 190. However, a storage device such as the memory 102, a register in the processor 101, and a cache memory in the processor 101 may function as the storage unit 190 in place of the storage 103 or together with the storage 103.

The program creation assistance system 100 may include a plurality of processors as an alternative to the processor 101.

The program creation assistance program can be recorded (stored) in a computer readable format in a non-volatile recording medium such as an optical disc or a flash memory.

Based on FIG. 3, a functional configuration of the program creation assistance system 100 will be described. A solid-line arrow represents a readout relationship, and a dashed-line arrow represents a flow of data from a replacement database 191.

The program creation assistance system 100 includes the acceptance unit 110, the instruction unification unit 120, the candidate extraction unit 130, and the output unit 140.

The instruction unification unit 120 includes an instruction comparison unit 121 and a program conversion unit 122.

The candidate extraction unit 130 includes a program fragmentation unit 131, a fragment group extraction unit 132, a dependency analysis unit 133, a fragment group pair extraction unit 134, a fragment group pair comparison unit 135, a functionalization candidate extraction unit 136, and a functionalization candidate aggregation unit 137.

Figure 2:
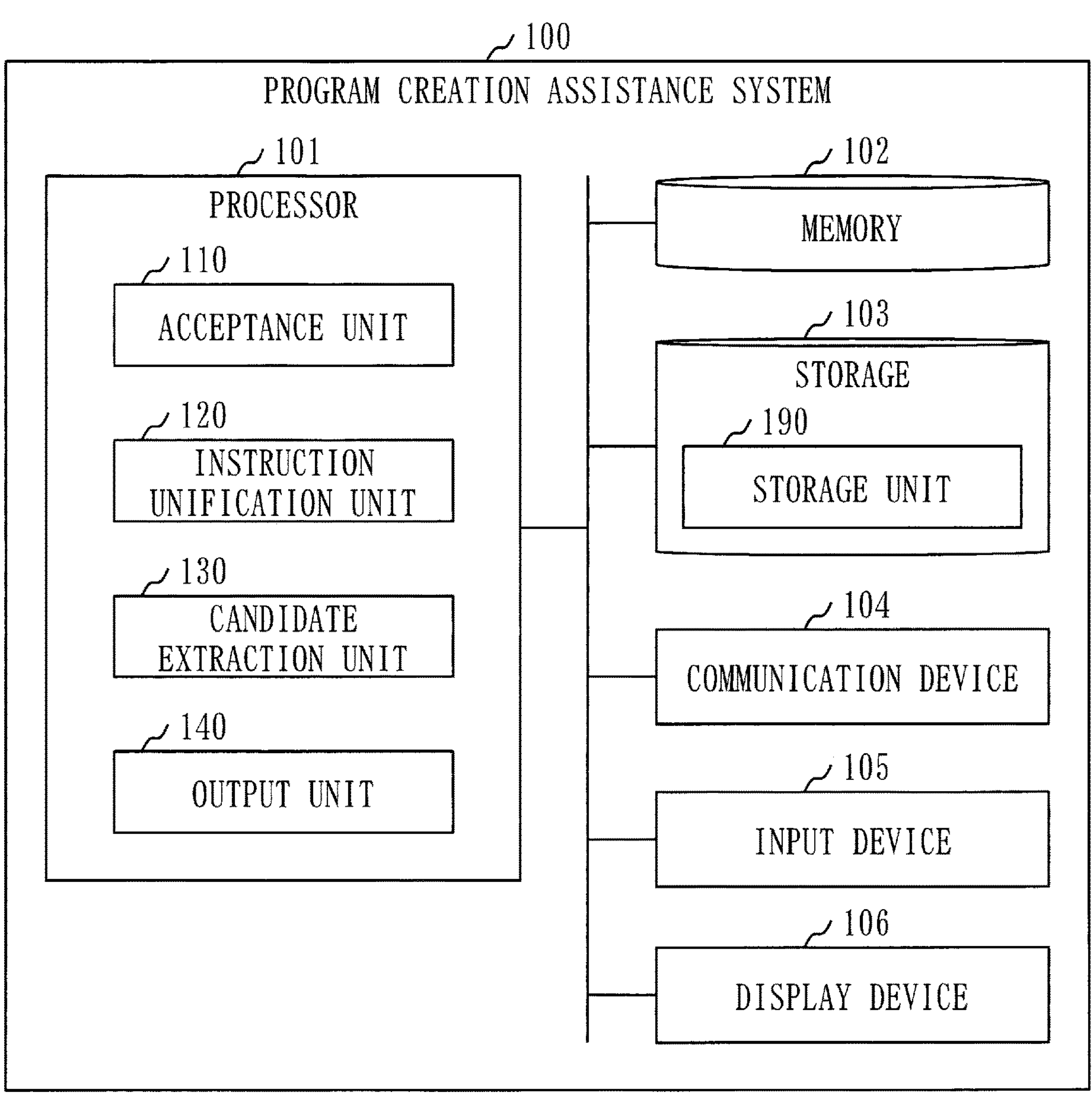
FIG. 2 is a configuration diagram of a program creation assistance system 100 in Embodiment 1.

The replacement database 191 is stored in the storage unit 190 (see FIG. 2).

*Description of Operation*

A procedure for operation of the program creation assistance system 100 is equivalent to a program creation assistance method. The procedure for operation of the program creation assistance system 100 is also equivalent to a procedure for processing by the program creation assistance program.

Figure 4:
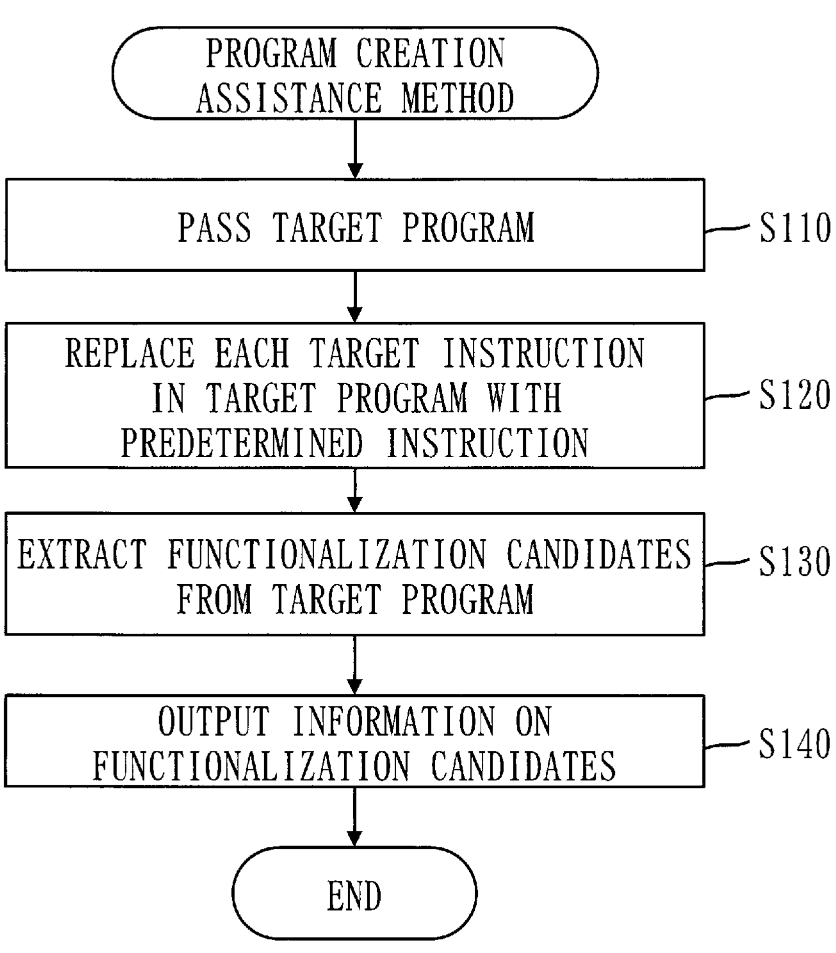
FIG. 4 is a flowchart of a program creation assistance method in Embodiment 1.

Based on FIG. 4, the program creation assistance method will be described.

In step S110, the acceptance unit 110 detects an action by the input device 105, such as a click of the mouse.

Then, the acceptance unit 110 reads out a target program from the storage unit 190, and passes the target program to the instruction unification unit 120.

The target program is a (source) program processed by the program creation assistance system 100 to extract functionalization candidates, and is stored in the storage unit 190. The target program may be a single program, or may be a plurality of programs.

The target program that is a ladder program will be presented below as an example. However, the target program may be a program written in a programming language such as ST language or SFC language.

ST is an abbreviation for structured text.

SFC is an abbreviation for sequential function chart.

In step S120, the instruction unification unit 120 refers to the replacement database 191, and replaces each instruction that is a replacement target among instructions in the target program with a predetermined instruction.

Then, the instruction unification unit 120 passes the target program after replacement to the candidate extraction unit 130.

The replacement database 191 indicates one or more replacement rules.

A replacement rule includes a replacement condition and replacement details.

The replacement condition is a condition for an instruction to be a replacement target.

The replacement details are details of replacement of the instruction to be the replacement target with a predetermined instruction.

Depending on the replacement rule, it may be necessary to refer to another instruction or edit another instruction.

Figure 5:
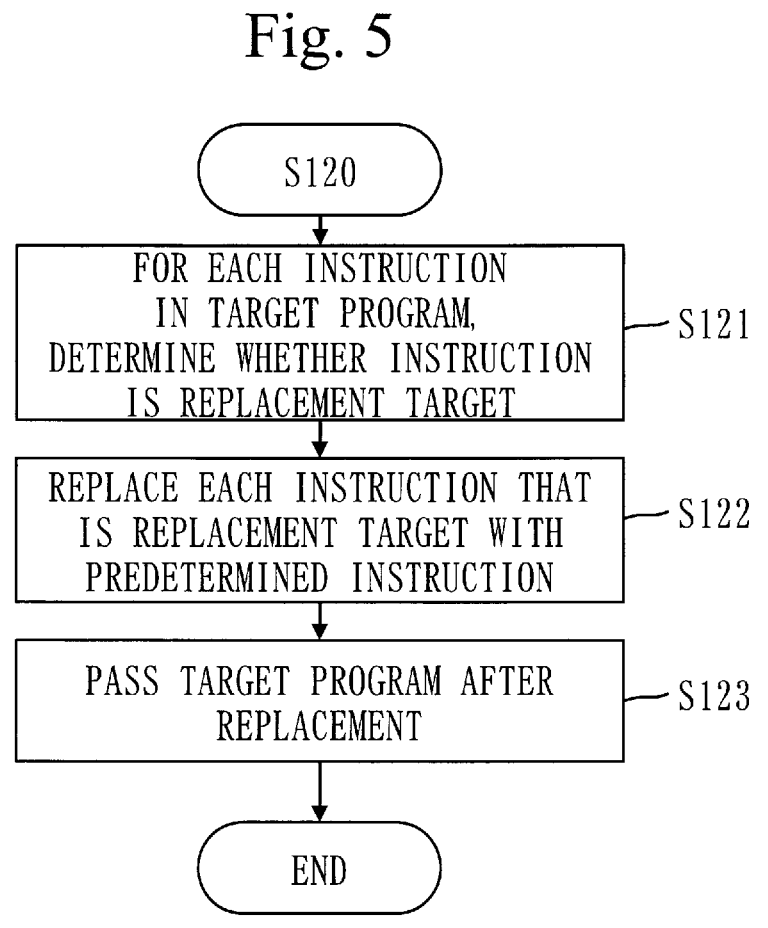

Based on FIG. 5, a procedure for step S120 will be described.

In step S121, for each instruction in the target program, the instruction comparison unit 121 determines whether the instruction is a replacement target according to the replacement conditions indicated in the replacement database 191.

In step S122, for each instruction that is the replacement target, the program conversion unit 122 replaces the instruction that is the replacement target with a predetermined instruction in accordance with the replacement rule indicated in the replacement database 191.

In step S123, the program conversion unit 122 passes the target program after replacement to the candidate extraction unit 130.

FIG. 6 illustrates an example of the replacement database 191.

In FIG. 6, the replacement database 191 indicates a plurality of replacement rules.

In the first replacement rule, the replacement condition is "a branch instruction is used", and the replacement details are "write the branch instruction separately".

In the second replacement rule, the replacement condition is "an instruction starting with "D" is used", and the replacement details are "replace with an instruction without "D".

Figure 7:
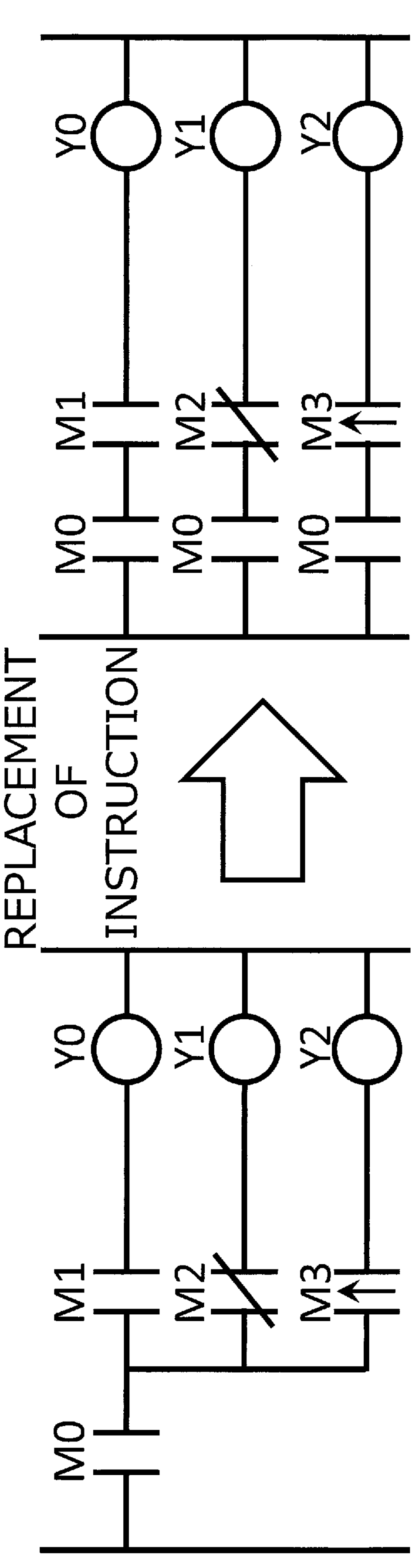
FIG. 7 is a figure illustrating an example of replacement of an instruction in Embodiment 1.

FIG. 7 illustrates an example of replacement based on the first replacement rule.

Figure 8:
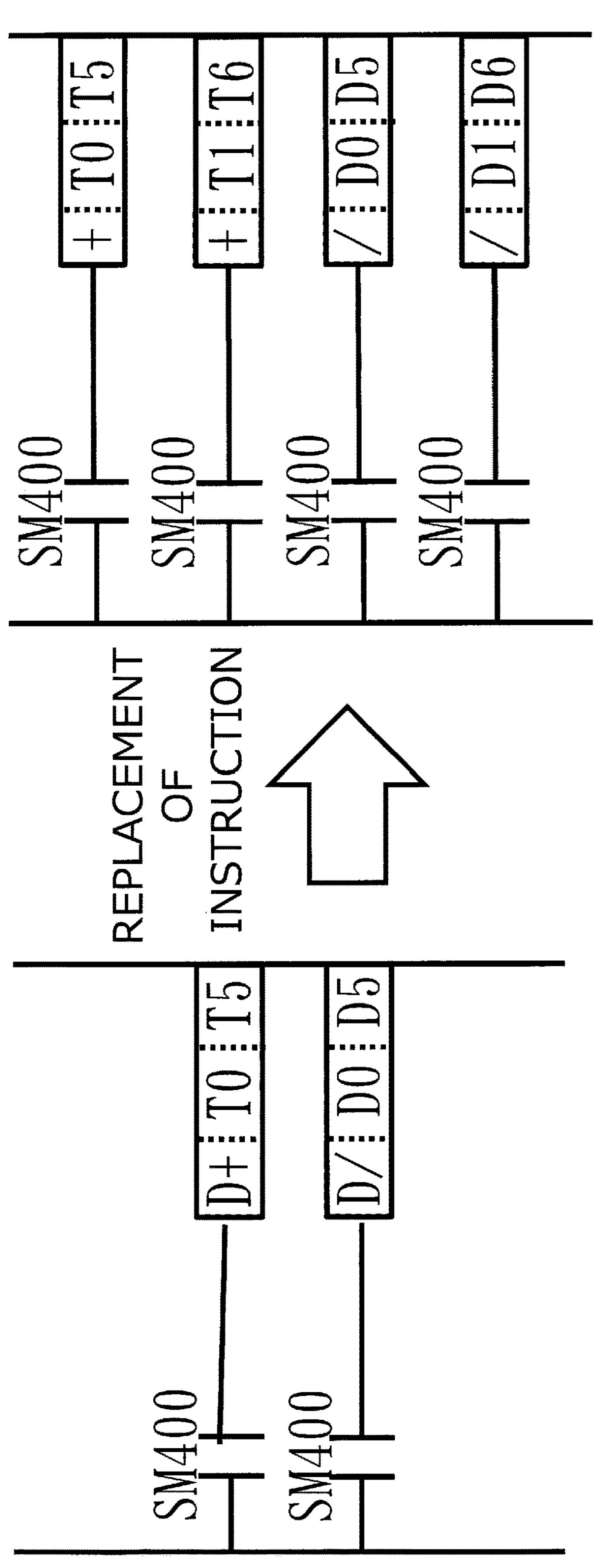
FIG. 8 is a figure illustrating an example of replacement of an instruction in Embodiment 1.

FIG. 8 illustrates an example of replacement based on the second replacement rule.

Referring back to FIG. 4, the description will be continued from step S130.

In step S130, the candidate extraction unit 130 divides the target program after replacement into fragments, and extracts a fragment group to be a functionalization candidate.

Figure 9:
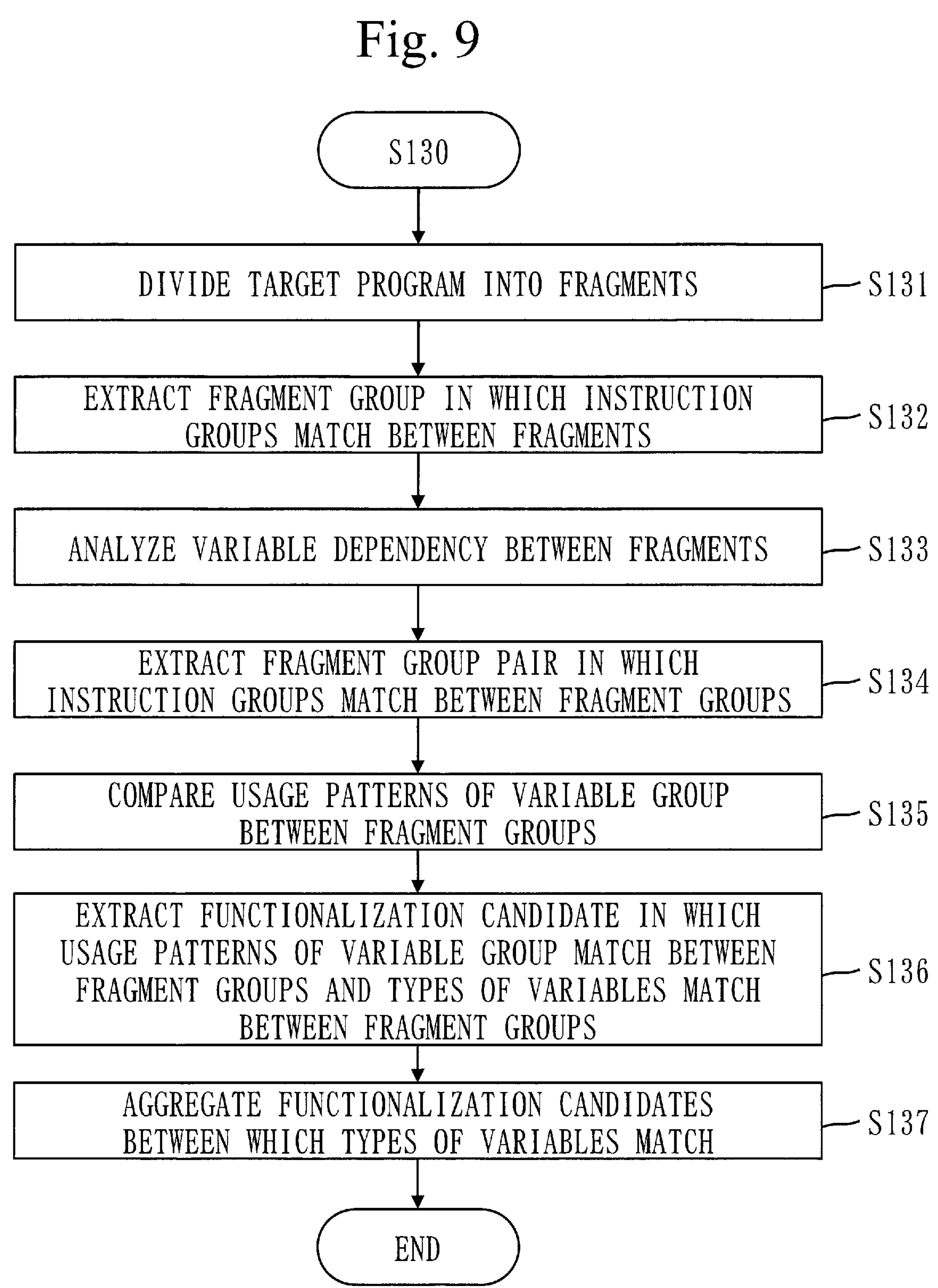
FIG. 9 is a flowchart of step S130 in Embodiment 1.

Based on FIG. 9, a procedure for step S130 will be described.

In step S131, the program fragmentation unit 131 divides the target program into fragments according to groups of processing.

The unit of fragmentation may be lines, or may be tokens.

Figure 10:
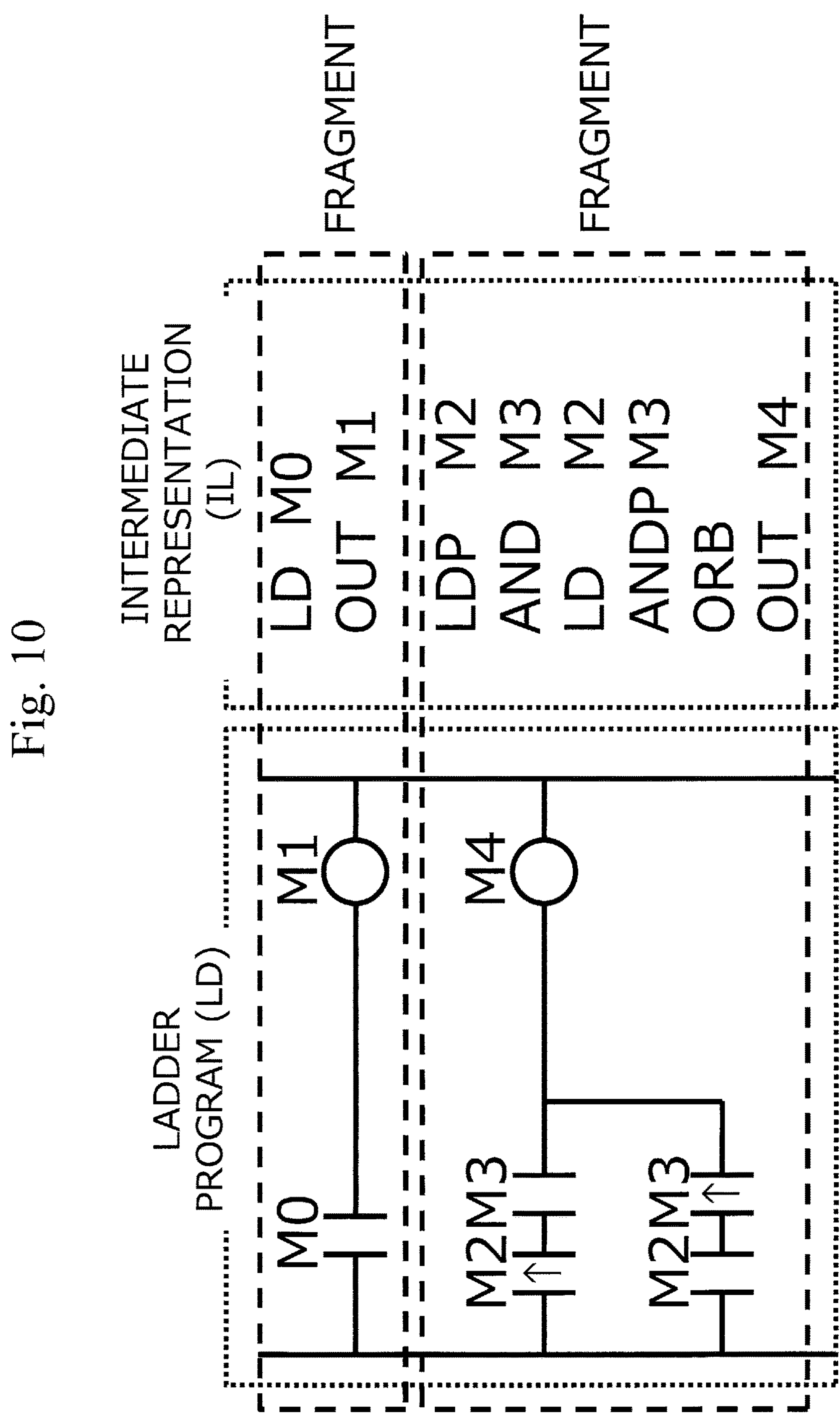
FIG. 10 is a figure illustrating an example of a fragmented ladder program in Embodiment 1.

FIG. 10 illustrates an example of a ladder program fragmented in units of tokens. "LD" means ladder diagram. "IL" means instruction list.

In the ladder program, one rung corresponds to one token. A "rung" means a unit from input to output in a ladder circuit.

In FIG. 10, the ladder program is divided into two fragments.

Referring back to FIG. 9, the description will be continued from step S132.

In step S132, for each set of fragments in the target program, the fragment group extraction unit 132 compares instruction groups between the fragments to determine whether the instruction groups match between the fragments.

A instruction group is one or more instructions included in a fragment.

Then, the fragment group extraction unit 132 extracts, from among sets of fragments in the target program, each set in which instruction groups match between the fragments. The extracted set will be referred to as a "fragment group".

Figure 11:
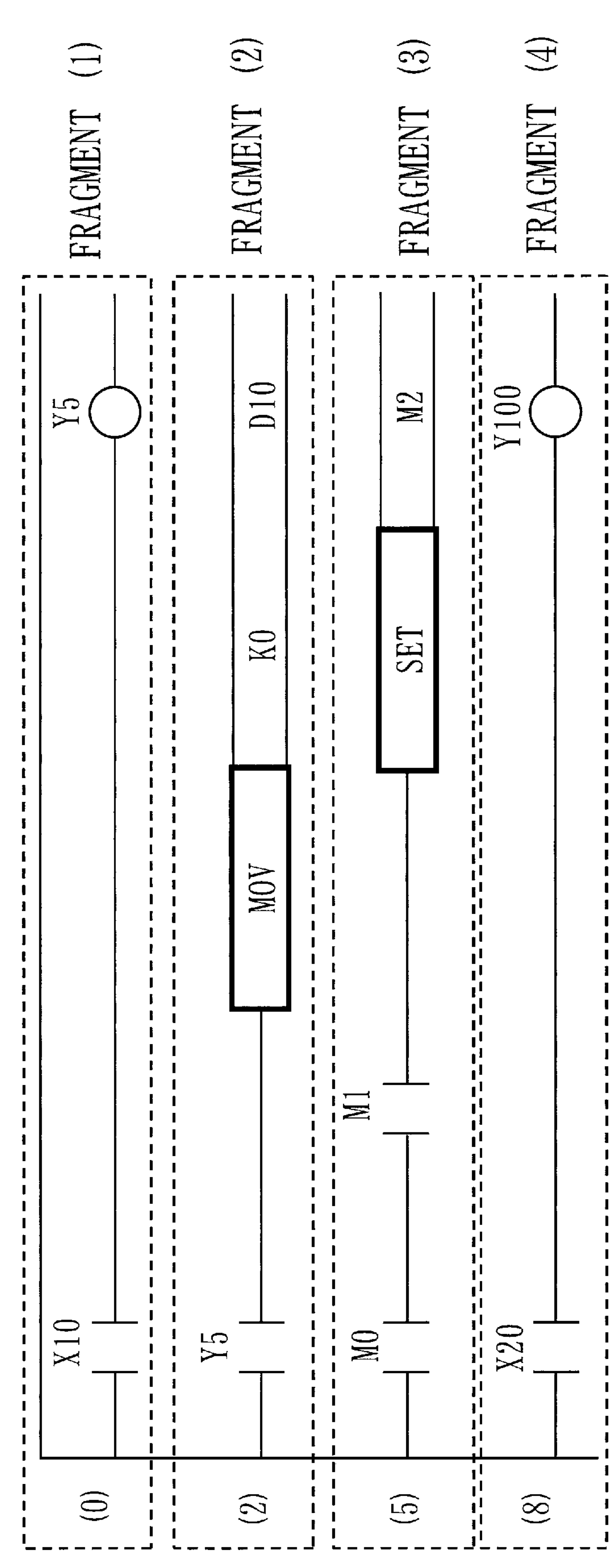
FIG. 11 is a figure illustrating an example of a fragmented ladder program in Embodiment 1.

FIG. 11 illustrates an example of a fragmented ladder program. Each of numbers written in parentheses at the left end represents the number of steps (program scale).

Figure 12:
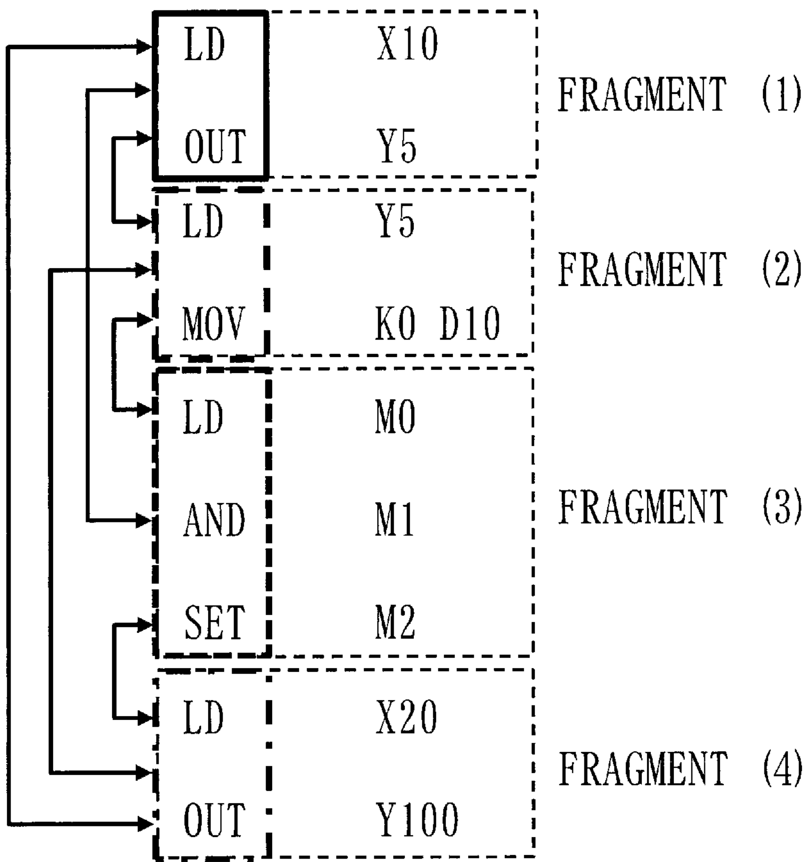
FIG. 12 is a figure illustrating an intermediate representation of the fragmented ladder program (FIG. 11) in Embodiment 1.

FIG. 12 illustrates an intermediate representation (IL) of the ladder program of FIG. 11. Each of arrows linking fragments represents comparison of the instruction groups between the fragments.

The instruction group of a fragment (1) is "LD, OUT". The instruction group of a fragment (4) is "LD, OUT".

Therefore, the instruction group of the fragment (1) matches the instruction group of the fragment (4).

Referring back to FIG. 9, the description will be continued from step S133.

In step S133, for each set of fragments in the target program, the dependency analysis unit 133 analyzes a variable dependency between the fragments.

If both of the fragments use the same variable and one of the fragments reads this variable and the other one of the fragments writes to this variable, there is a variable dependency between the fragments.

Figure 13:
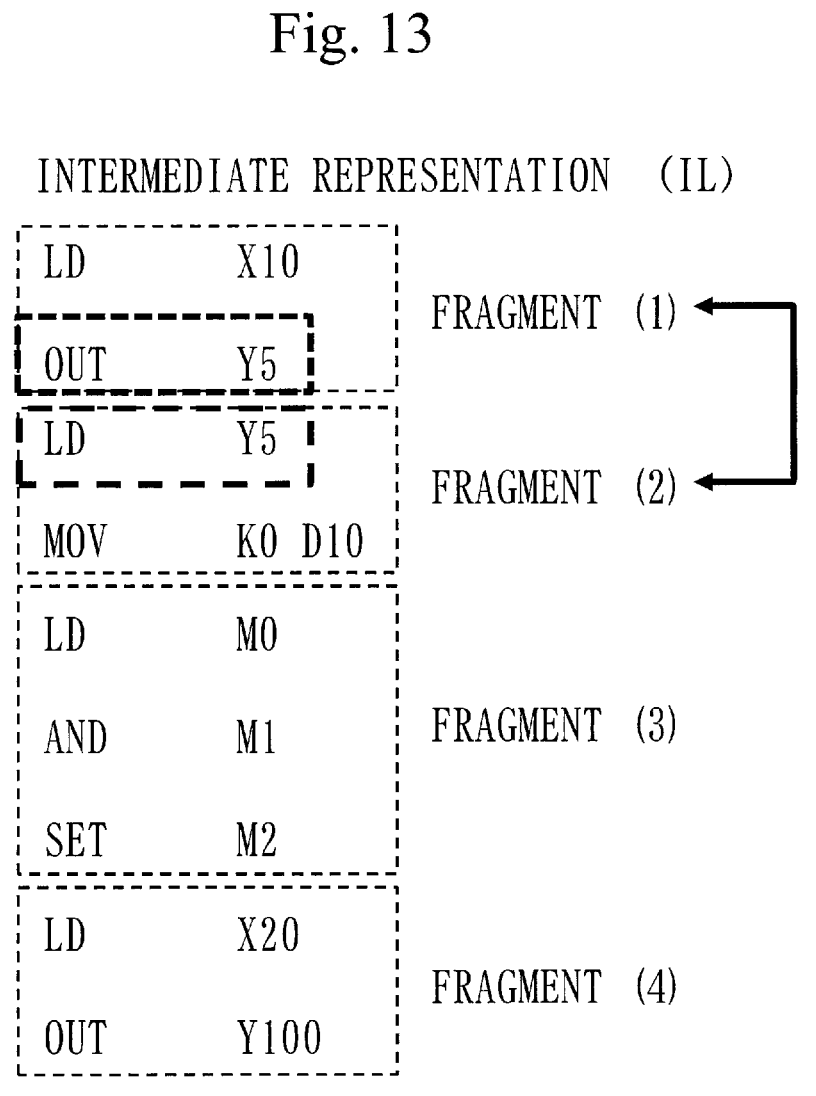

FIG. 13 illustrates an intermediate representation (IL) of the ladder program of FIG. 11.

A fragment (1) writes to a variable Y5, and a fragment (2) reads the variable Y5.

Therefore, the fragment (1) and the fragment (2) has a dependency concerning the variable Y5.

Referring back to FIG. 9, the description will be continued from step S134.

In step S134, for each set of fragment groups, the fragment group pair extraction unit 134 compares instruction groups between the fragment groups to determine whether the instruction groups match between the fragment groups.

Then, the fragment group pair extraction unit 134 extracts, from among sets of fragments, each set in which the instruction groups match between the fragment groups. The extracted set will be referred to as a "fragment group pair".

For each fragment group pair, the fragment group pair extraction unit 134 makes a determination on types (1) to (3) for the fragment group pair, based on a result of an analysis on each fragment group included in the fragment group pair. The result of the analysis on each fragment group (set of fragments) is obtained in step S133.

(1) The sequences of the instruction groups match without interchanging fragments.

(2) The sequences of the instruction groups match if fragments are interchanged, and there is no variable dependency problem even if the fragments are interchanged.

(3) The sequences of the instruction groups match if fragments are interchanged, and there is a variable dependency problem if the fragments are interchanged.

However, interchanging of fragments is limited to interchanging within one program.

FIG. 14 illustrates an example of a fragmented ladder program.

FIG. 15 illustrates an intermediate representation (IL) of the ladder program of FIG. 14.

The instruction group of a fragment group (1, 2) is "LD, OUT, LD, MOV". The instruction group of a fragment group (4, 5) is "LD, OUT, LD, MOV". That is, the instruction group of the fragment group (1, 2) matches the instruction group of the fragment group (4, 5).

The sequence of the instruction group of the fragment group (1, 2) matches the sequence of the instruction group of the fragment group (4, 5) without interchanging a fragment (1) and a fragment (2) or interchanging a fragment (4) and a fragment (5).

Therefore, the fragment group (1, 2) and the fragment group (4, 5) are a fragment group pair of the type (1).

Figure 16:
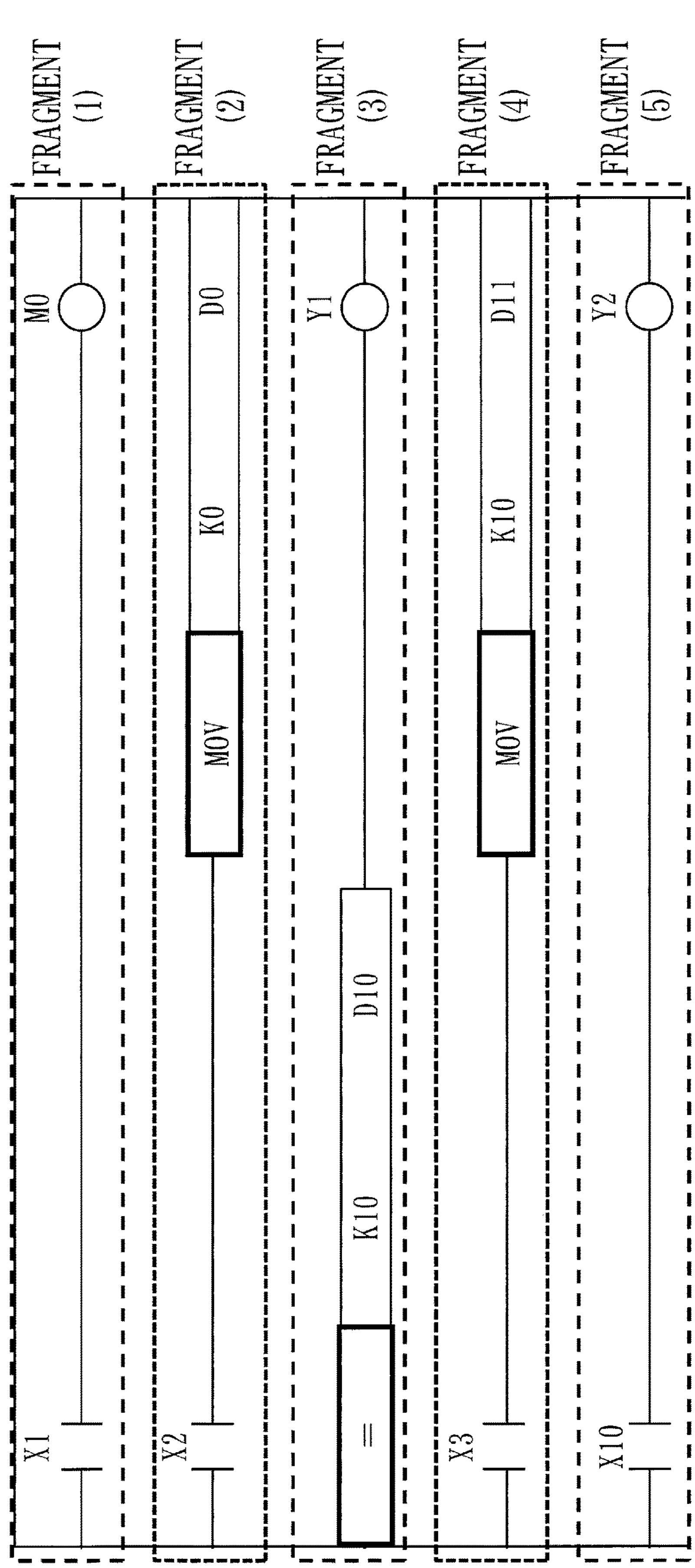
FIG. 16 is a figure illustrating an example of a fragmented ladder program in Embodiment 1.

FIG. 16 illustrates an example of a fragmented ladder program.

FIG. 17 illustrates an intermediate representation (IL) of the ladder program of FIG. 16.

The instruction group of a fragment group (1, 2) is "LD, OUT, LD, MOV". The instruction group of a fragment group (4, 5) is "LD, MOV, LD, OUT". That is, the instruction group of the fragment group (1, 2) matches the instruction group of the fragment group (4, 5).

The sequence of the instruction group of the fragment group (1, 2) matches the sequence of the instruction group of the fragment group (4, 5) if a fragment (1) and a fragment (2) are interchanged or a fragment (4) and a fragment (5) are interchanged.

Furthermore, there is no variable dependency between the fragment (1) and the fragment (2), and there is no variable dependency between the fragment (4) and the fragment (5). Therefore, even if the fragment (1) and the fragment (2) are interchanged or even if the fragment (4) and the fragment (5) are interchanged, there is no variable dependency problem between the fragments.

Therefore, the fragment group (1, 2) and the fragment group (4, 5) are a fragment group pair of the type (2).

Figure 18:
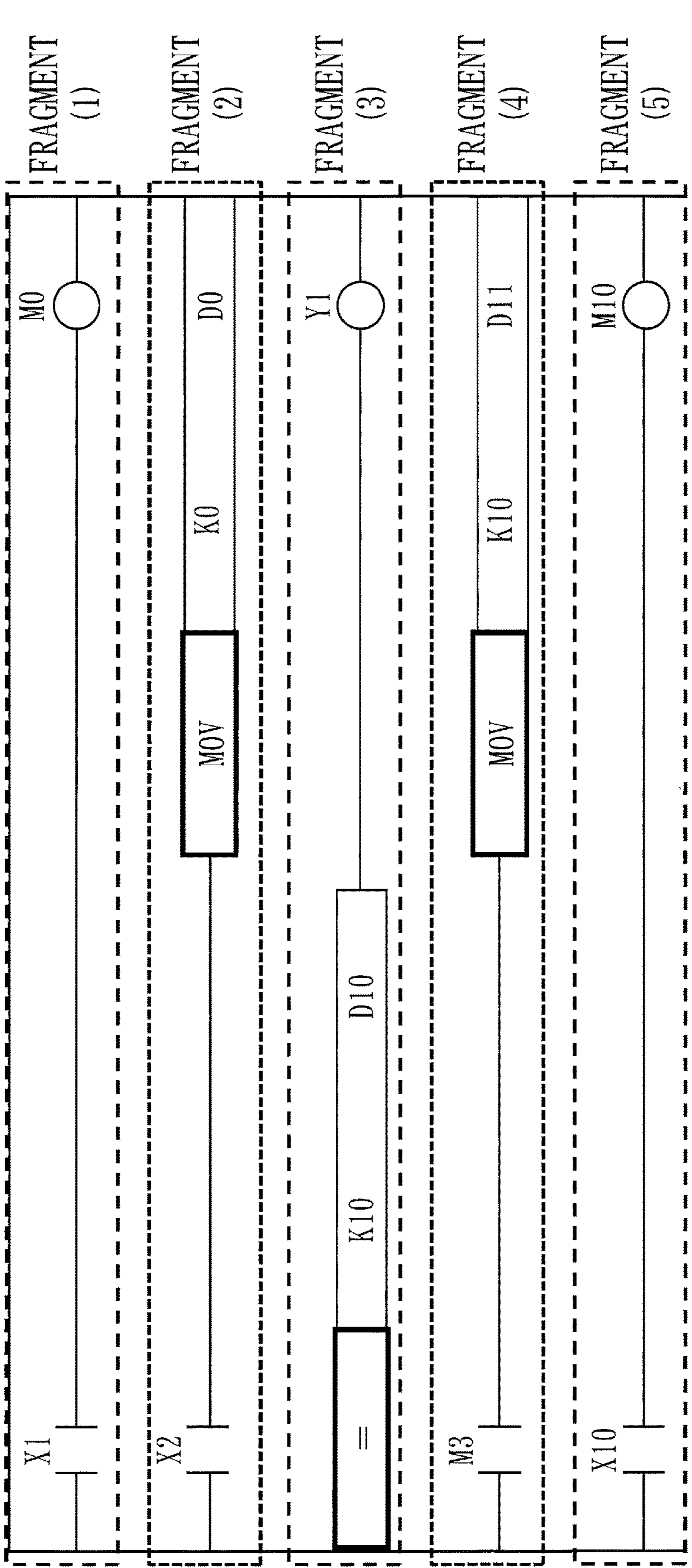
FIG. 18 is a figure illustrating an example of a fragmented ladder program in Embodiment 1.

FIG. 18 illustrates an example of a fragmented ladder program.

FIG. 19 illustrates an intermediate representation (IL) of the ladder program of FIG. 18.

The instruction group of a fragment group (1, 2) is "LD, OUT, LD, MOV". The instruction group of a fragment group (4, 5) is "LD, MOV, LD, OUT". That is, the instruction group of the fragment group (1, 2) matches the instruction group of the fragment group (4, 5).

The sequence of the instruction group of the fragment group (1, 2) matches the sequence of the instruction group of the fragment group (4, 5) if a fragment (1) and a fragment (2) are interchanged.

Furthermore, there is no variable dependency between the fragment (1) and the fragment (2), but there is a dependency concerning a variable M10 between a fragment (4) and a fragment (5). Therefore, if the fragment (4) and the fragment (5) are interchanged, there is a dependency problem concerning the variable M10.

Therefore, the fragment group (1, 2) and the fragment group (4, 5) are a fragment group pair of the type (3).

Referring back to FIG. 9, the description will be continued from step S135.

In step S135, for each fragment group pair, the fragment group pair comparison unit 135 compares usage patterns of a variable group between the fragment groups to determine whether the usage patterns of a variable group match between the fragment groups.

If the usage patterns of a variable group, such as the number of times each variable is used and the sequence of instructions concerning each variable, do not match between the fragment groups, the fragment group pair cannot be functionalized (made common). For this reason, step S135 is executed.

However, an input variable and an output variable can be set individually for a function, so that variable names in the respective variable groups do not need to match between the fragment groups.

Specifically, the fragment group pair comparison unit 135 operates as described below.

First, for each fragment group, the fragment group pair comparison unit 135 generates a string by sequentially arranging each instruction and each variable name in the fragment group.

Next, for each fragment group, the fragment group pair comparison unit 135 replaces each variable name in the string with a predetermined variable name according to the sequence. However, the same variable name in the string is replaced with the same predetermined variable name. For example, the fragment group pair comparison unit 135 replaces each variable name with "dx", where "x" is an index that increases from 0 by 1.

Next, the fragment group pair comparison unit 135 compares the strings between the fragment groups.

Then, if the strings match between the fragment groups, the fragment group pair comparison unit 135 determines that the usage patterns of a variable group match between the fragment groups.

FIG. 20 illustrates an example of a ladder program.

FIG. 21 illustrates an intermediate representation (IL) of the ladder program of FIG. 20.

A fragment (1) and a fragment (2) will be referred to as a fragment group (A). A fragment (4) and a fragment (5) will be referred to as a fragment group (B). The fragment group (A) and the fragment group (B) are a fragment group pair.

FIG. 22 illustrates a string obtained from the fragment group (A) and a string obtained from the fragment group (B).

A string (A) is obtained by extracting each instruction and each variable name sequentially from the fragment group (A).

A string (A') is obtained by replacing each variable name in the string (A) with a predetermined variable name according to the sequence.

A string (B) is obtained by extracting each instruction and each variable name sequentially from the fragment group (B).

A string (B') is obtained by replacing each variable name in the string (B) with a predetermined variable name according to the sequence.

The string (A') matches the string (B').

Therefore, the fragment group (A) and the fragment group (B) match in terms of the usage pattern of a variable group.

Referring back to FIG. 9, the description will be continued from step S136.

In step S136, for each fragment group pair in which the usage patterns of a variable group match between the fragment groups, the functionalization candidate extraction unit 136 determines whether the types of variables match between the fragment groups.

For example, types of variables include an input variable, an output variable, an input/output variable, and an internal variable.

For example, a static analysis tool can be used to find out dependencies between variables. The static analysis tool is used in combination with a type condition list. The type condition list indicates variable conditions for each type of variable.

Then, the functionalization candidate extraction unit 136 extracts, from among fragment group pairs, each fragment group pair in which the usage patterns of a variable group match between the fragment groups and the types of variables match between the fragment groups. The extracted fragment group pair will be referred to as a "functionalization candidate".

Figure 23:
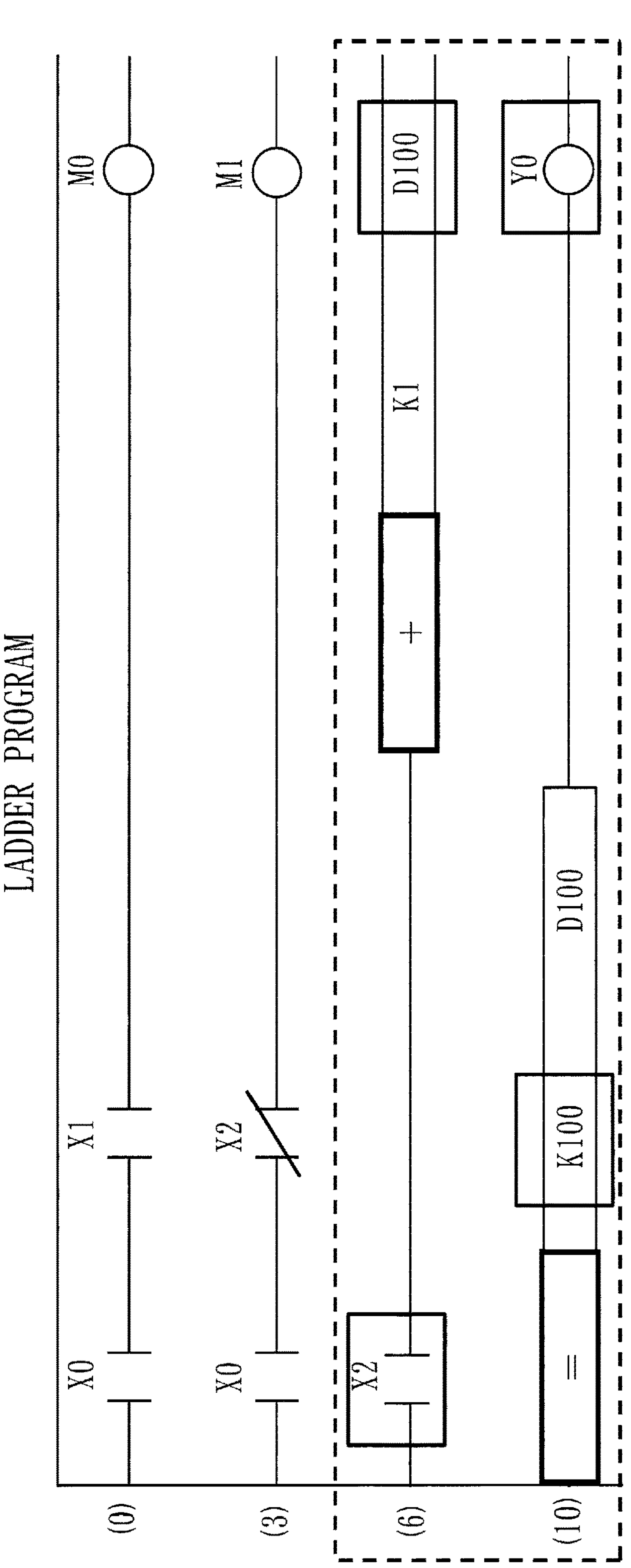
FIG. 23 is a figure illustrating an example of a ladder program in Embodiment 1.

FIG. 23 illustrates an example of a ladder program.

Figure 24:
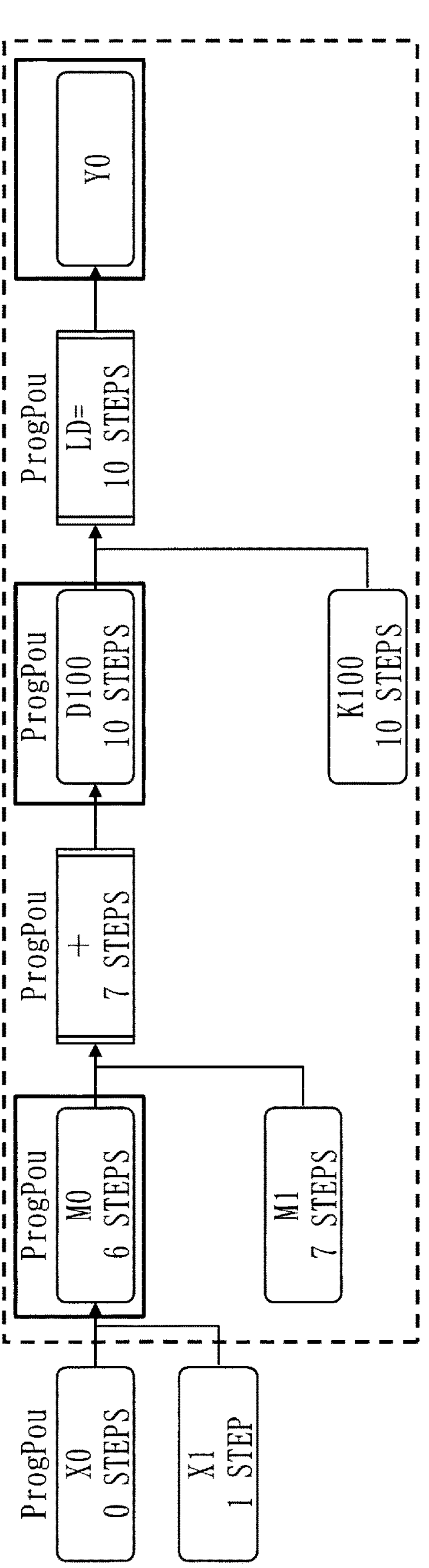
FIG. 24 is a figure illustrating a result of a static analysis on the ladder program (FIG. 23) in Embodiment 1.

FIG. 24 illustrates an example of a result of an analysis obtained by using the static analysis tool on the ladder program of FIG. 23.

In each of FIGS. 23 and 24, a range enclosed by dashed lines is a functionalization target range.

The program name is ProgPou.

The number of steps at the start is six steps.

The number of steps at the end is 14 steps.

A static analysis is to be performed on a fragment (6) and a fragment (10).

The starting point of the static analysis is "Y0".

Figure 25:
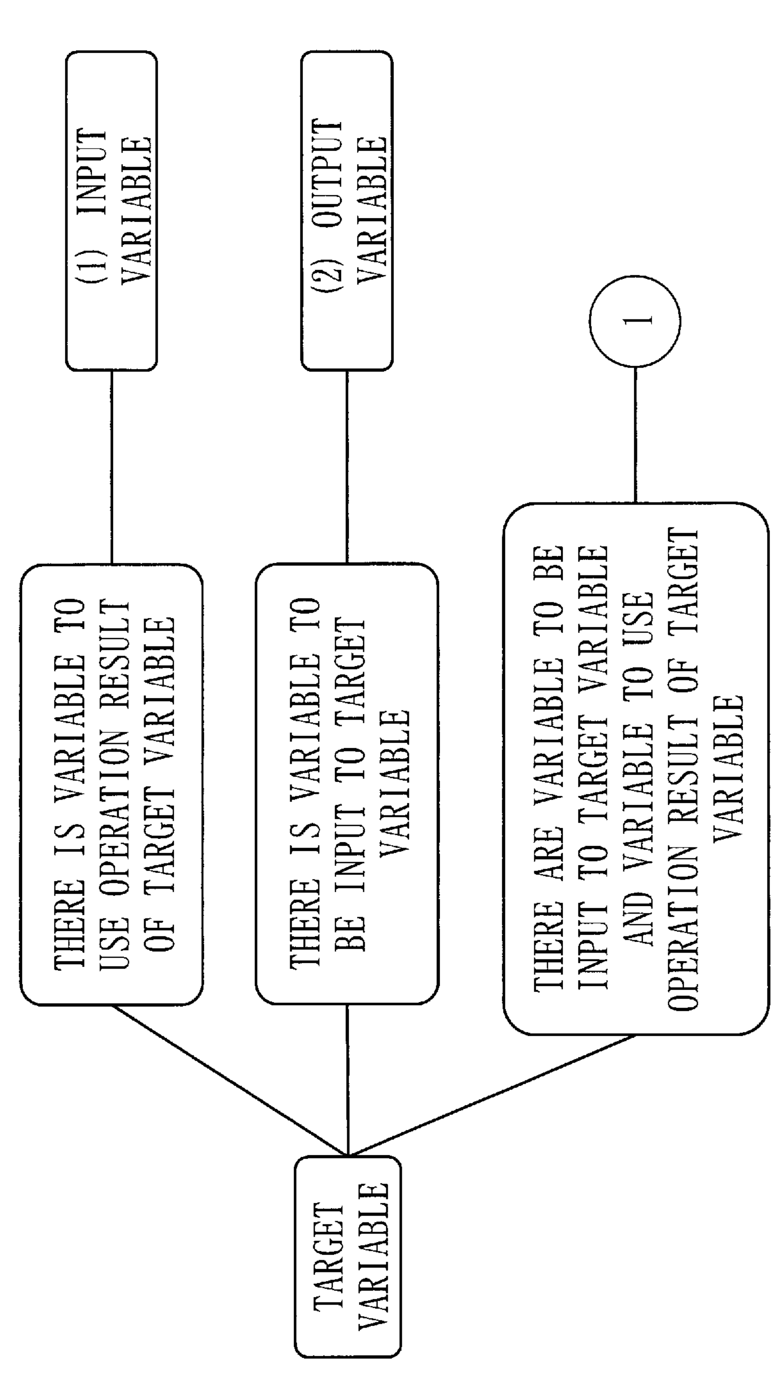
FIG. 25 is a figure illustrating a list of type conditions in Embodiment 1.
Figure 26:
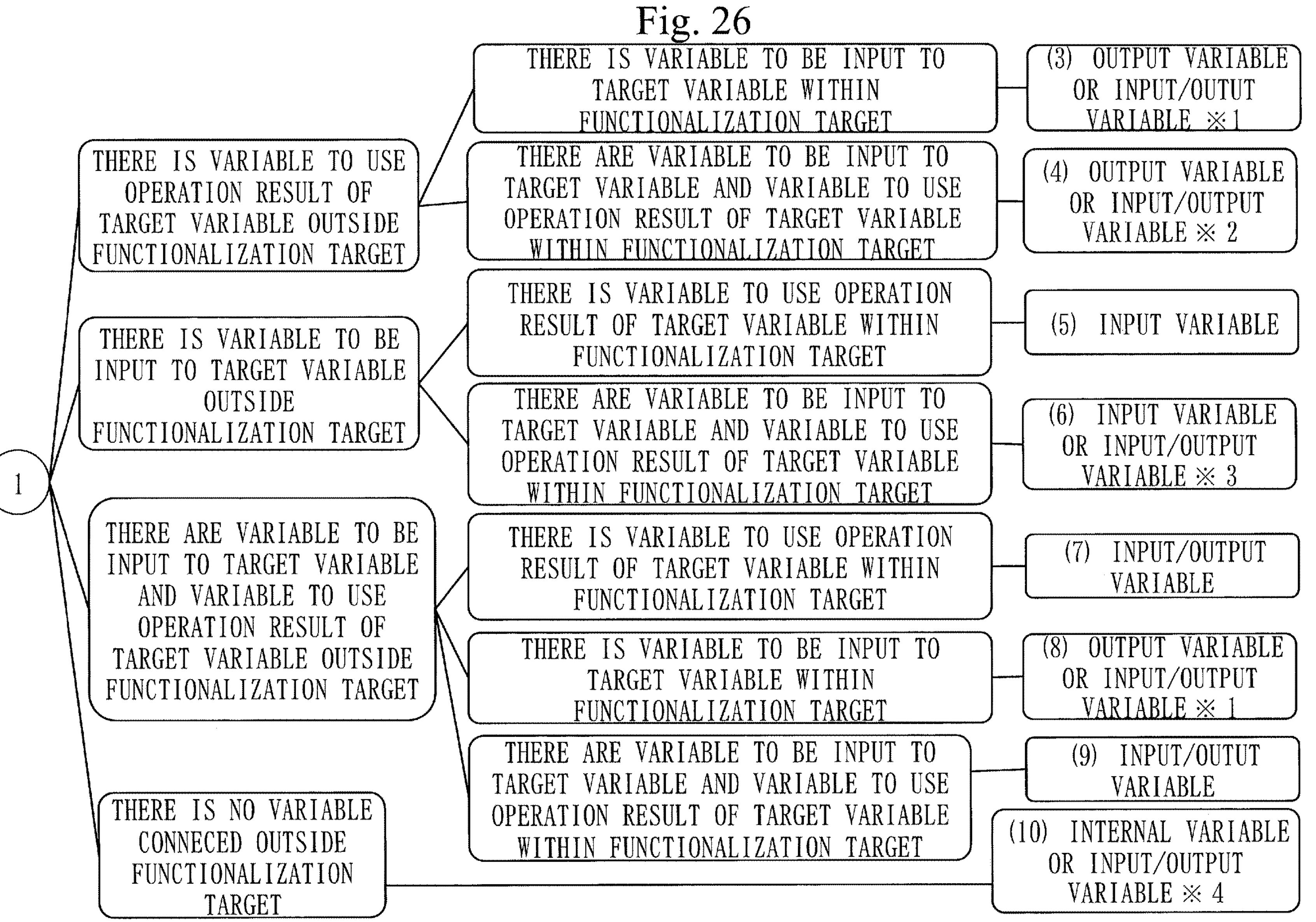
FIG. 26 is a figure illustrating a list of type conditions in Embodiment 1.

FIGS. 25 and 26 illustrate an example of the type condition list.

The type condition list indicates conditions respectively for type (1) to type (10).

The meanings of ·X·1 to ·X·4 of FIG. 26 are as described below.

- ·X·1: Only if the value of the target variable does not need to be retained in light of the content of processing, the type of the target variable can be an output variable.
- ·X·2: Only if the number of steps of every variable connected to the left side is smaller than the number of steps of a variable on the right side and the value of the target variable does not need to be retained in light of the content of processing, the type of the target variable can be an output variable.
- ·X·3: Only if the number of steps of every variable connected to the left side is smaller than the number of steps of a variable on the right side, the type of the target variable can be an input variable.
- ·X·4: Only if the number of steps of ever variable connected to the left side is smaller than the number of steps of a variable on the right side and the value of the target variable does not need to be retained in light of the content of processing, the type of the target variable can be an internal variable.

Note that even if an input/output variable, instead of an input variable, is defined as a parameter of a function, there is no problem in processing of the function, so that under any conditions in FIGS. 25 and 26, input/output variables can be candidates.

Based on FIGS. 24 to 26, variable type candidates in functionalization will be described.

In "M0" in FIG. 24, an input "X0" is outside the functionalization target, and an output "D100" of "M0" is within the functionalization target. The input variable corresponding to (5) of FIG. 26 is a candidate.

In "D100" of FIG. 24, an input "M0" is within the functionalization target", and an output "Y0" is within the functionalization target. The internal variable corresponding to (10) of FIG. 26 is a candidate.

In "Y0" of FIG. 24, an input "D100" is within the functionalization target. There is no output. The output variable corresponding to (2) of FIG. 25 is a candidate.

Referring back to FIG. 9, step S137 will be described.

In step S137, the functionalization candidate aggregation unit 137 compares the types of variables between functionalization candidates to determine whether the types of variables match between the functionalization candidates.

Then, the functionalization candidate aggregation unit 137 aggregates the functionalization candidates between which the types of variables match.

Referring back to FIG. 4, step S140 will be described.

In step S140, the output unit 140 outputs information on the functionalization candidates.

Specifically, the output unit 140 displays information for each aggregation of functionalization candidates on the display device 106. Display is an example of output.

The information that is output includes information obtained in each step in step S130. For example, the information that is output includes the types of fragment group pairs included in the aggregation of functionalization candidates.

Figure 27:
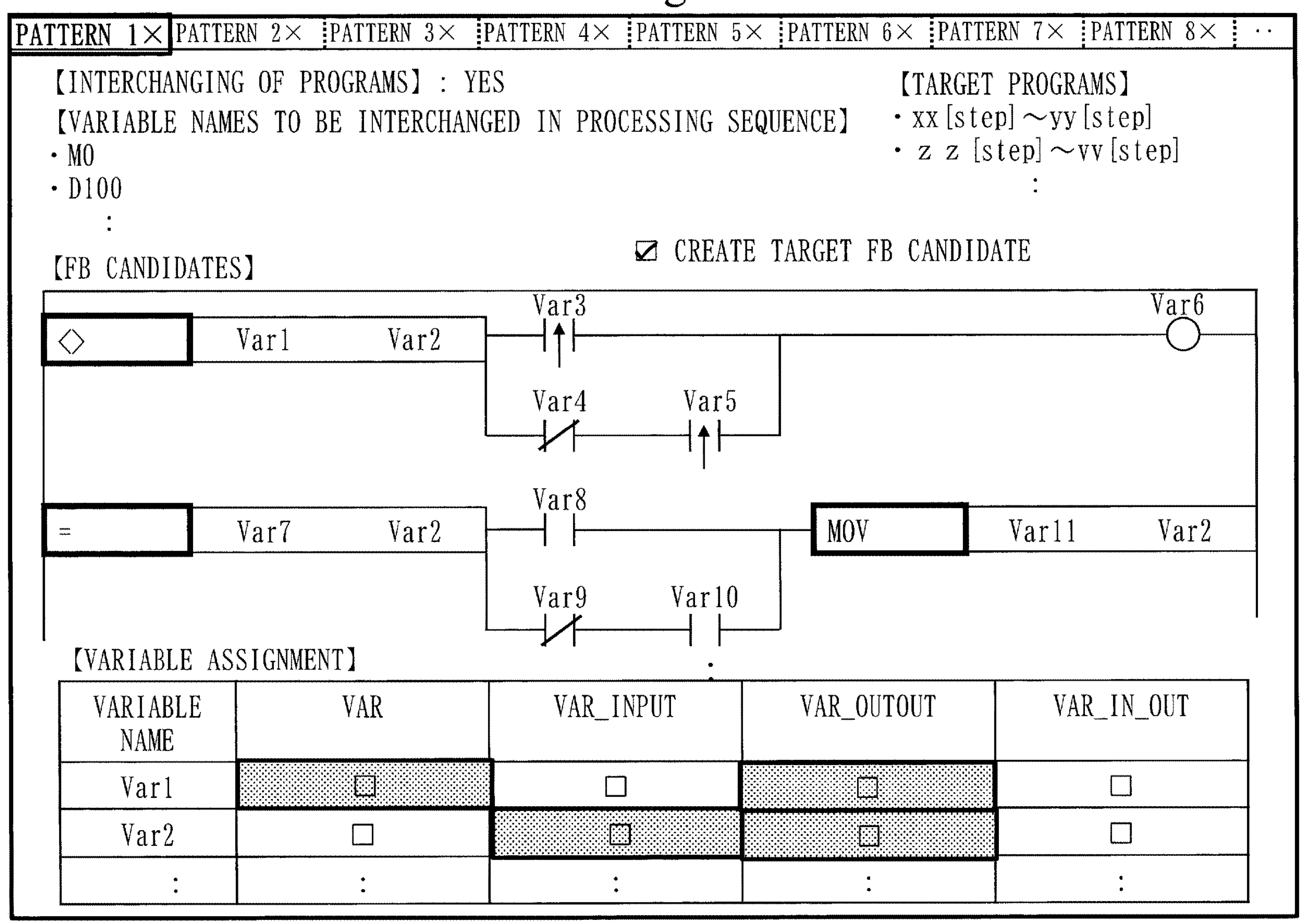
FIG. 27 is a figure illustrating an example of a display screen of functionalization candidates in Embodiment 1.
Figure 28:
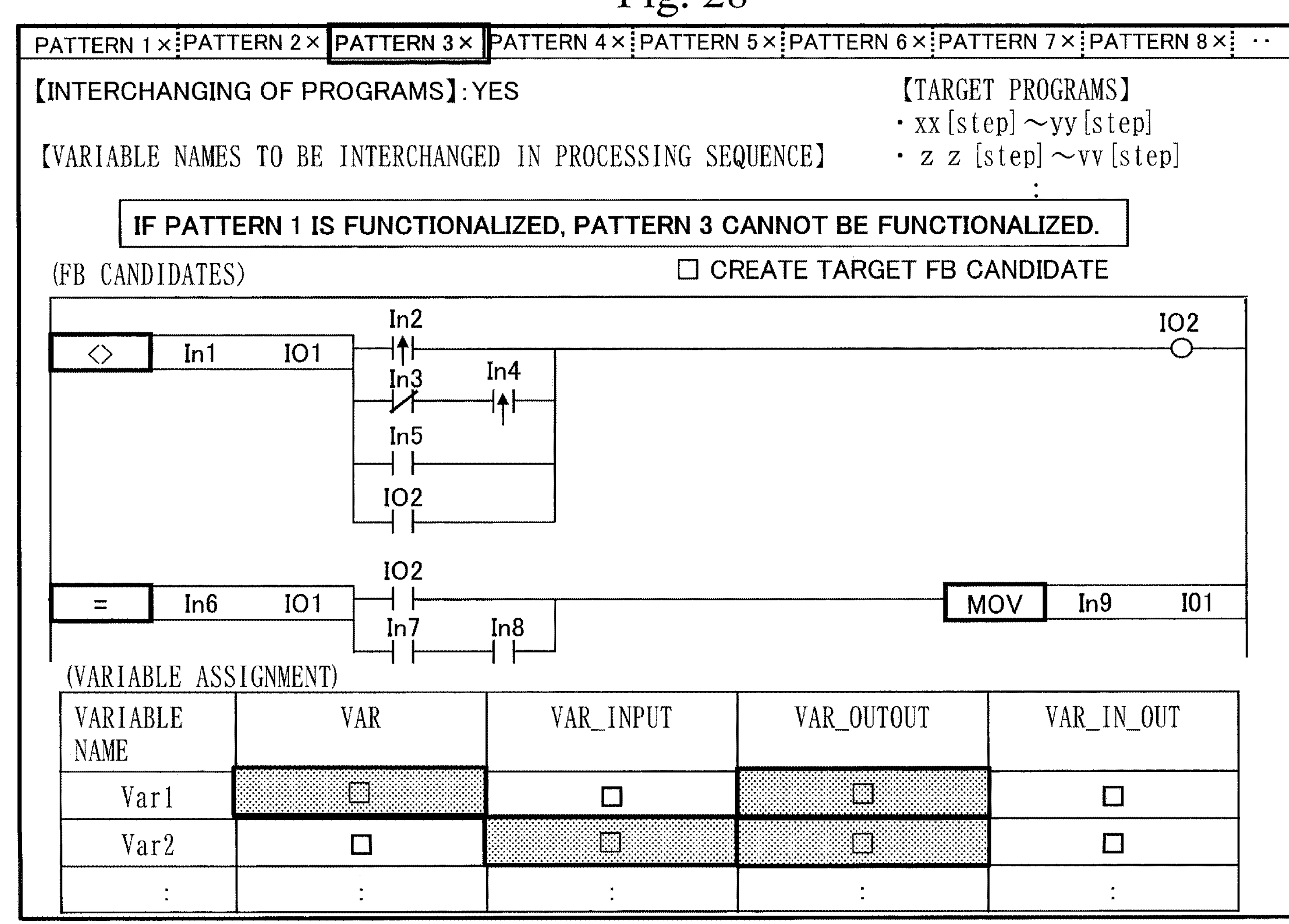
FIG. 28 is a figure illustrating an example of a display screen of functionalization candidates in Embodiment 1.

FIGS. 27 and 28 illustrate examples of a display screen of functionalization candidates.

FIG. 27 indicates a pattern 1 of an aggregation of functionalization candidates. In [Variable Assignment], shaded portions indicate types of variables that cannot be used.

FIG. 28 indicates a pattern 3 of an aggregation of functionalization candidates. It is also indicated that if the pattern 1 is functionalized, the pattern 3 cannot be functionalized.

Summary of Embodiment 1

The program creation assistance system 100 has functions (1) to (3).

(1) The same process written using different instructions in a target program is unified into the same instruction. This function is realized by the instruction unification unit 120.

(2) Functionalization candidates that have the same configuration if the sequence is changed are found. This function is realized by the candidate extraction unit 130.

(3) Functionalization candidates are displayed by being divided into those in which the execution sequence of programs (fragments) is not changed, those in which changing the execution sequence of programs does not affect a dependency between the programs, and those in which changing the execution sequence of programs affects a dependency between the programs. This function is realized by the candidate extraction unit 130 and the output unit 140.

Effects of Embodiment 1

According to Embodiment 1, functionalization candidates in a target program can be presented.

Depending on the programmer, the method of writing (instructions used) and the sequence of description may differ even for the same process. Embodiment 1 allows functionalization candidates to be extracted regardless of the instructions used and the sequence of description.

Embodiment 1 can be expected to reduce engineering man-hours required for extraction of common processes by a user.

Supplement to Embodiment

Figure 29:
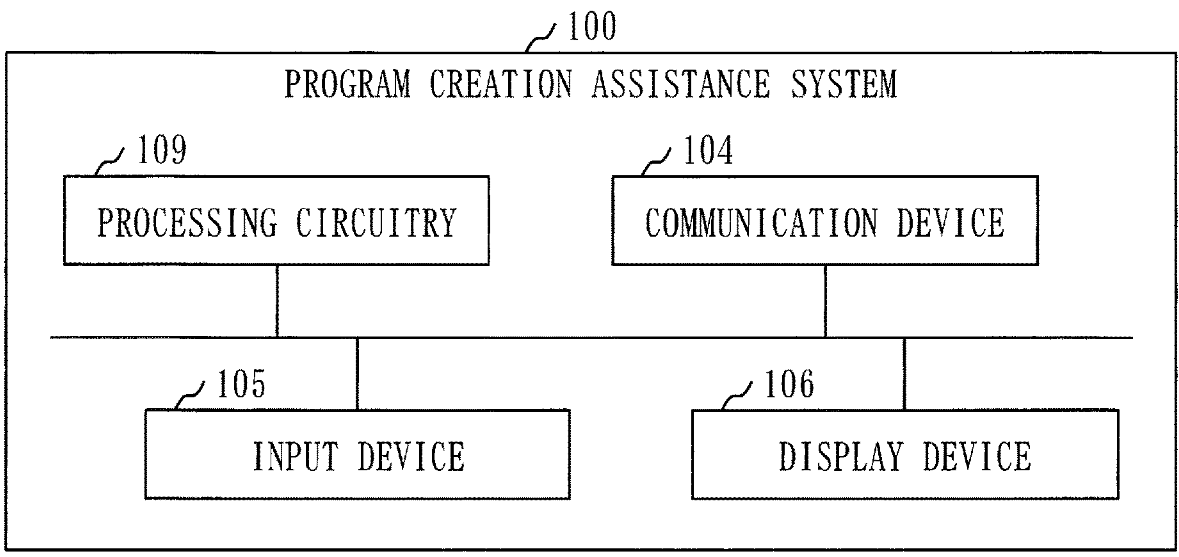
FIG. 29 is a hardware configuration diagram of the program creation assistance system 100 in Embodiment 1.

Based on FIG. 29, a hardware configuration of the program creation assistance system 100 will be described.

The program creation assistance system 100 includes processing circuitry 109.

The processing circuitry 109 is hardware that realizes the acceptance unit 110, the instruction unification unit 120, the candidate extraction unit 130, and the output unit 140.

The processing circuitry 109 may be dedicated hardware, or may be the processor 101 that executes programs stored in the memory 102.

When the processing circuitry 109 is dedicated hardware, the processing circuitry 109 is, for example, a single circuit, a composite circuit, a programmed processor, a parallel-programmed processor, an ASIC, an FPGA, or a combination of these.

ASIC is an abbreviation for application specific integrated circuit.

FPGA is an abbreviation for field programmable gate array.

The program creation assistance system 100 may include a plurality of processing circuits as an alternative to the processing circuitry 109.

In the processing circuitry 109, some functions may be realized by dedicated hardware, and the remaining functions may be realized by software or firmware.

As described above, the functions of the program creation assistance system 100 can be realized by hardware, software, firmware, or a combination of these.

Each embodiment is an example of a preferred embodiment and is not intended to limit the technical scope of the present disclosure. Each embodiment may be implemented partially or may be implemented in combination with another embodiment. The procedures described using the flowcharts or the like may be changed as appropriate.

The program creation assistance system 100 may be realized by a plurality of devices.

Each "unit" that is an element of the program creation assistance system 100 may be interpreted as "process", "step", "circuit", or "circuitry".

REFERENCE SIGNS LIST

100: program creation assistance system, 101: processor, 102: memory, 103: storage, 104: communication device, 105: input device, 106: display device, 109: processing circuitry, 110: acceptance unit, 120: instruction unification unit, 121: instruction comparison unit, 122: program conversion unit, 130: candidate extraction unit, 131: program fragmentation unit, 132: fragment group extraction unit, 133: dependency analysis unit, 134: fragment group pair extraction unit, 135: fragment group pair comparison unit, 136: functionalization candidate extraction unit, 137: functionalization candidate aggregation unit, 140: output unit, 190: storage unit, 191: replacement database, 200: program operation system, 201: network, 202: network, 210: control device, 220: factory line, 221: facility.

The invention claimed is:

1. A program creation assistance system comprising processing circuitry to:

divide a target program into fragments according to groups of processing;

extract, from among sets of fragments, each set in which instruction groups match between fragments, as a fragment group;

extract, from among sets of fragment groups, a set in which instruction groups match between fragment groups, usage patterns of a variable group match between the fragment groups, and types of variables match between the fragment groups, as a functionalization candidate; and output information on the functionalization candidate, wherein the processing circuitry extracts, from among sets of fragment groups, each set in which instruction groups match between fragment groups, as a fragment group pair, determines, for each fragment group pair, whether usage patterns of a variable group match between fragment groups, and generates, for each fragment group included in the fragment group pair, a string by sequentially arranging each instruction and each variable name in the fragment group, replaces each variable name in the string with a predetermined variable name according to a sequence for each fragment group included in the fragment group pair, compares the strings between the fragment groups, and determines that usage patterns of the variable group match between the fragment groups when strings match between the fragment groups.

2. The program creation assistance system according to claim 1, wherein the processing circuitry compares types of variables between functionalization candidates, and aggregates functionalization candidates between which types of variables match, and for each aggregation of functionalization candidates between which types of variables match, outputs information on the aggregation of functionalization candidates.

3. The program creation assistance system according to claim 1, wherein the processing circuitry analyzes, for each fragment group, a variable dependency between fragments, extracts, from among sets of fragment groups, each set in which instruction groups match between fragment groups as a fragment group pair, and for each fragment group pair, determines a type of the fragment group pair based on a result of an analysis on each fragment group included in the fragment group pair, and outputs the information including a type of a fragment group pair to be the functionalization candidate.

4. The program creation assistance system according to claim 3, wherein the processing circuitry determines, for each fragment group pair, whether the type of the fragment group pair is which one of a type in which sequences of instructions groups match without interchanging fragments, a type in which sequences of instruction groups match when fragments are interchanged and there is no variable dependency problem between the fragments even when the fragments are interchanged, and a type in which sequences of instruction groups match when fragments are interchanged and there is a variable dependency problem between the fragments when the fragments are interchanged.

5. The program creation assistance system according to claim 1, wherein the processing circuitry refers to a replacement database that indicates one or more replacement rules, and replaces each instruction that is a replacement target among instructions in the target program with a predetermined instruction, and divides the target program after replacement into fragments.

6. The program creation assistance system according to claim 2, wherein the processing circuitry analyzes, for each fragment group, a variable dependency between fragments, extracts, from among sets of fragment groups, each set in which instruction groups match between fragment groups as a fragment group pair, and for each fragment group pair, determines a type of the fragment group pair based on a result of an analysis on each fragment group included in the fragment group pair, and outputs the information including a type of a fragment group pair to be the functionalization candidate.

7. The program creation assistance system according to claim 2, wherein the processing circuitry refers to a replacement database that indicates one or more replacement rules, and replaces each instruction that is a replacement target among instructions in the target program with a predetermined instruction, and divides the target program after replacement into fragments.

8. The program creation assistance system according to claim 3, wherein the processing circuitry refers to a replacement database that indicates one or more replacement rules, and replaces each instruction that is a replacement target among instructions in the target program with a predetermined instruction, and divides the target program after replacement into fragments.

9. The program creation assistance system according to claim 4, wherein the processing circuitry refers to a replacement database that indicates one or more replacement rules, and replaces each instruction that is a replacement target among instructions in the target program with a predetermined instruction, and divides the target program after replacement into fragments.

10. The program creation assistance system according to claim 6, wherein the processing circuitry refers to a replacement database that indicates one or more replacement rules, and replaces each instruction that is a replacement target among instructions in the target program with a predetermined instruction, and divides the target program after replacement into fragments.

11. A non-transitory computer readable medium storing a program creation assistance program to cause a computer to execute:

a program fragmentation process of dividing a target program into fragments according to groups of processing;

a fragment group extraction process of extracting, from among sets of fragments, each set in which instruction groups match between fragments, as a fragment group;

a functionalization candidate extraction process of extracting, from among sets of fragment groups, a set in which instruction groups match between fragment groups, usage patterns of a variable group match between the fragment groups, and types of variables match between the fragment groups, as a functionalization candidate; and an output process of outputting information on the functionalization candidate, wherein the a program creation assistance program also causes the computer to:

extract, from among sets of fragment groups, each set in which instruction groups match between fragment groups, as a fragment group pair, determine, for each fragment group pair, whether usage patterns of a variable group match between fragment groups, and generate, for each fragment group included in the fragment group pair, a string by sequentially arranging each instruction and each variable name in the fragment group, replaces each variable name in the string with a predetermined variable name according to a sequence for each fragment group included in the fragment group pair, compares the strings between the fragment groups, and determines that usage patterns of the variable group match between the fragment groups when strings match between the fragment groups.

* * * * *